(12) United States Patent
Miller et al.

(10) Patent No.: US 12,113,237 B2
(45) Date of Patent: Oct. 8, 2024

(54) SEPARATORS WITH FIBROUS MAT, LEAD ACID BATTERIES USING THE SAME, AND METHODS AND SYSTEMS ASSOCIATED THEREWITH

(71) Applicant: Daramic, LLC, Charlotte, NC (US)

(72) Inventors: Eric H. Miller, Philpot, KY (US); Ahila Krishnamoorthy, Bangalore (IN); James P. Perry, Utica, KY (US); J. Kevin Whear, Utica, KY (US)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 18/203,140

(22) Filed: May 30, 2023

(65) Prior Publication Data
US 2023/0307788 A1   Sep. 28, 2023

Related U.S. Application Data

(62) Division of application No. 17/359,510, filed on Jun. 26, 2021, now Pat. No. 11,664,557, which is a
(Continued)

(51) Int. Cl.
*H01M 50/44* (2021.01)
*B01D 69/10* (2006.01)
(Continued)

(52) U.S. Cl.
CPC ........ *H01M 50/44* (2021.01); *B01D 69/1071* (2022.08); *H01M 10/12* (2013.01);
(Continued)

(58) Field of Classification Search
CPC .. H01M 50/44; H01M 50/449; H01M 50/411; H01M 50/463; B01D 69/10;
(Continued)

(56) References Cited

U.S. PATENT DOCUMENTS

| 4,288,503 A | 9/1981 | Goldberg |
| 4,465,748 A | 8/1984 | Harris |

(Continued)

FOREIGN PATENT DOCUMENTS

| CA | 2062419 | 9/1992 |
| EP | 1585182 | 10/2005 |

(Continued)

OTHER PUBLICATIONS

K. Ihmels et al., "Cllapter 7, Separator Matei-iais for Valve-Reguiated Lead-Acid Batteries," Elsevier B.V., 2004, D.A.J. Rand et al. editors, pp. 183-205.
(Continued)

*Primary Examiner* — Amanda C. Walke
(74) *Attorney, Agent, or Firm* — Hammer & Associates, P.C.

(57) ABSTRACT

In at least one embodiment, a separator is provided with a fibrous mat for retaining the active material on an electrode of a lead-acid battery. New or improved mats, separators, batteries, methods, and/or systems are also disclosed, shown, claimed, and/or provided. For example, in at least one possibly preferred embodiment, a composite separator is provided with a fibrous mat for retaining the active material on an electrode of a lead-acid battery. In at least one possibly particularly preferred embodiment, a PE membrane separator is provided with at least one fibrous mat for retaining the active material on an electrode of a lead-acid battery. In accordance with at least certain embodiments, aspects and/or objects, the present invention, application, or disclosure may provide solutions, new products, improved products, new methods, and/or improved methods, and/or may address issues, needs, and/or problems of PAM shedding, NAM shedding, electrode distortion, active material shedding, active material loss, and/or physical separation, electrode
(Continued)

effectiveness, battery performance, battery life, and/or cycle life, and/or may provide new battery separators, new battery technology, and/or new battery methods and/or systems that address the challenges arising from current lead acid batteries or battery systems, especially new battery separators, new battery technology, and/or new battery methods and/or systems adapted to prevent or impede the shedding of active material from the electrodes, preferably or particularly in enhanced flooded lead acid batteries, PSoC batteries, ISS batteries, ESS batteries, and/or the like.

19 Claims, 27 Drawing Sheets

Related U.S. Application Data division of application No. 16/484,511, filed as application No. PCT/US2018/017534 on Feb. 9, 2018, now Pat. No. 11,128,014.

(51) Int. Cl.

| | | |
|---|---|---|
| H01M 10/12 | (2006.01) | |
| H01M 50/414 | (2021.01) | |
| H01M 50/417 | (2021.01) | |
| H01M 50/42 | (2021.01) | |
| H01M 50/437 | (2021.01) | |
| H01M 50/451 | (2021.01) | |
| H01M 50/454 | (2021.01) | |
| H01M 50/489 | (2021.01) | |
| H01M 50/491 | (2021.01) | |

(52) U.S. Cl.
CPC ....... *H01M 50/414* (2021.01); *H01M 50/417* (2021.01); *H01M 50/42* (2021.01); *H01M 50/437* (2021.01); *H01M 50/451* (2021.01); *H01M 50/454* (2021.01); *B01D 2325/028* (2013.01); *B01D 2325/0281* (2022.08); *B01D 2325/20* (2013.01); *B01D 2325/26* (2013.01); *H01M 50/489* (2021.01); *H01M 50/491* (2021.01)

(58) Field of Classification Search
CPC .......... B01D 2325/02; B01D 2325/028; B01D 2325/20; B01D 2325/26
See application file for complete search history.

(56) References Cited

U.S. PATENT DOCUMENTS

| 5,154,988 | A | 10/1992 | Clloi et al. |
|---|---|---|---|
| 5,221,587 | A | 6/1993 | Bohnstedt et al. |
| 5,468,575 | A | 11/1995 | Holland et al. |
| 5,665,488 | A | 9/1997 | Young et al. |
| 6,242,127 | B1 | 6/2001 | Paik et al. |
| 6,492,059 | B1 | 12/2002 | Hattori et al. |
| 6,505,522 | B1 | 1/2003 | Clough et al. |
| 6,689,509 | B2 | 2/2004 | Zucker |
| 6,703,161 | B2 | 3/2004 | Zucker |
| 6,852,444 | B2 | 2/2005 | Zucker |
| 7,094,498 | B2 | 8/2006 | Miller et al. |
| 2001/0012972 | A1 | 8/2001 | Matsumoto et al. |
| 2003/0054237 | A1 | 3/2003 | Zucker |
| 2005/0003726 | A1 | 1/2005 | Zguris et al. |
| 2005/0008475 | A1 | 4/2005 | Vaccaro et al. |
| 2008/0029946 | A1 | 12/2008 | Whear et al. |
| 2008/0299462 | A1 | 12/2008 | Whear et al. |
| 2011/0091761 | A1 | 4/2011 | Miller et al. |
| 2011/0229750 | A1 | 9/2011 | McClellan et al. |
| 2011/0318629 | A1 | 12/2011 | Ho et al. |
| 2012/0070714 | A1 | 3/2012 | Chambers et al. |
| 2012/0094183 | A1 | 4/2012 | Deiters et al. |

FOREIGN PATENT DOCUMENTS

| JP | 2001102027 | 4/2001 |
|---|---|---|
| JP | 2002-198023 | 7/2002 |
| JP | 202298204 | 10/2002 |
| JP | 2002313305 | 10/2002 |
| JP | 2005-100808 | 4/2005 |
| JP | 2006100082 | 4/2006 |
| JP | 2008226697 | 9/2008 |
| JP | 2009-245901 | 10/2009 |
| JP | 2013008454 | 1/2013 |

OTHER PUBLICATIONS

Jorg Deiters et al., "A New Polyethylene Separator for Heavy-Duty Traction Batteries," Journal of Power Sources 158 (2006), Elsevier BV, pp. 1069-1072.

M.L. Sorita et al., "Development of H1gti Power VRLA Batteries Using Novel Materials and Processes," Journal of Power Sources 5111 (2002), Elsevier B.V. pp. 1-12.

M. Perrin et al., "Effect of Compression on the Behaviour of Lead-Acid Batteries," Journal of Power Sources 407 1 (2000), Elsevier B.V., pp. 1-12.

M Perrin et al., "Extending Cycle Life of Lead Acid Batteries: A New Separation System Allows the Application of Pressure on the Plate Group," Reference info not available.

K. Ihmels and W. Boehnstedt, "Chapter 7—Separator Materials for Valve-Regulated Lead-Acid Batteries," Valve-Regulated Lead-Acid Batteries, Elsevier, D.A.J. Rand et al. editors, pp. 184-205 (2004).

- Repeating unit shown
- Three continuous variables
  - 1mm < Height < 15mm
  - 15° < Angle < 165°
  - 0.5 mm < Column Spacing < 15mm
- Three binary variables
  - Column 1 switch directions
  - Column 2 switch directions
  - Column 1 to 2 switch directions
- Dependent variables ensure:
  - Full coverage of separator area
  - Overlap between columns
  - Centered columns within separator

- Repeating unit shown
- Three continuous variables
  - Height = 9.6 mm
  - Angle = 72°
  - Column Spacing = 3 mm
  - Thickness = 1mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.8 mm
  - Angle = 77.2°
  - Column Spacing = 3.09 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.6 mm
  - Angle = 74.7°
  - Column Spacing = 3 mm
  - Thickness = 1 mm
- Three binary variables
  - Column 1 alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.5 mm
  - Angle = 78.3°
  - Column Spacing = 3.09 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Repeating unit shown
- Three continuous variables
  - Height = 9.6 mm
  - Angle = 73.8°
  - Column Spacing = 3 mm
  - Thickness = 1 mm
- Three binary variables
  - Column 1 no alternating
  - Column 2 alternating
  - Column 1 to 2 no switch
- Dependent variables ensure:
  - Full coverage of separator area
    - 13 columns of column 1 and 2
  - Overlap between columns
  - Centered columns within separator

- Separator broken up into 3 zones
  - Each zone is 47.33mm wide
- Zone 1 and 2 and 3 rib geometry may vary independently
- Zone 3 serration geometry may be identical to Zone 1
- 12 independent variables

- ◇ Objective
  - ◇ Maximize Volume Uniformity Increase
- ◇ Twelve variables
  - ◇ 2mm < Height$_{1,2}$ < 12mm
  - ◇ 45° < Angle$_{1,2}$ < 135°
  - ◇ 0.5mm < Column Spacing$_{1,2}$ < 12mm
  - ◇ Column 1 switch$_{1,2}$ directions
  - ◇ Column 2 switch$_{1,2}$ directions
  - ◇ Column 1 to 2 switch$_{1,2}$ directions

- Repeating unit shown
- Three continuous variables
  - 2mm < Height < 12mm
  - 45° < Angle < 135°
  - 0.5mm < Column Spacing < 12mm
- Three binary variables
  - Column 1 switch directions
  - Column 2 switch directions
  - Column 1 to 2 switch directions
- Dependent variables ensure:
  - Full coverage of zone
  - Overlap between columns
  - Centered columns within zone

SEPARATORS WITH FIBROUS MAT, LEAD ACID BATTERIES USING THE SAME, AND METHODS AND SYSTEMS ASSOCIATED THEREWITH

RELATED APPLICATIONS

This application is a Divisional Application to U.S. application Ser. No. 17/359,510, filed Jun. 26, 2021, which claims priority to U.S. Divisional application Ser. No. 16/484,511, filed Aug. 8, 2019, and issued as U.S. Pat. No. 11,128,014 on Sep. 21, 2021, which claims priority to PCT Application No. PCT/US2018/017534, filed Feb. 9, 2018, which are incorporated herein by reference in their entireties.

FIELD

In accordance with at least selected embodiments, the present disclosure or invention is directed to novel or improved separators, battery separators, flooded battery separators, enhanced flooded battery separators, fibrous mats, batteries, cells, and/or methods of manufacture and/or use of such separators, battery separators, fibrous mats, enhanced flooded battery separators, cells, and/or batteries. In accordance with at least certain embodiments, the present disclosure or invention is directed to novel or improved enhanced flooded lead acid battery separators for starting lighting ignition ("SLI") batteries, fibrous mats, flooded batteries for deep cycle applications, and/or enhanced flooded batteries, and/or systems, vehicles, and/or the like including such separators, mats or batteries, and/or improved methods of making and/or using such improved separators, mats, cells, batteries, systems, vehicles, and/or the like. In accordance with at least certain embodiments, the present disclosure or invention is directed to an improved separator for enhanced flooded batteries and/or improved methods of making and/or using such batteries having such improved separators. In accordance with at least selected embodiments, the present disclosure or invention is directed to separators, flooded battery separators, particularly separators for enhanced flooded batteries having reduced electrical resistance and/or increased cold cranking amps. In addition, disclosed herein are methods, systems, and battery separators for enhancing battery life, reducing water loss, reducing internal resistance, increasing wettability, reducing acid stratification, improving acid diffusion, improving cold cranking amps and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, increased porosity, increased void volume, amorphous silica, higher oil absorption silica, higher silanol group silica, retention and/or improved retention of active material on electrodes, and/or any combination thereof.

In accordance with at least selected embodiments, the present disclosure or invention is directed to separators for lead acid batteries, in particular flooded lead acid batteries, and various lead acid batteries, such as flooded lead acid batteries or enhanced flooded lead acid batteries, comprising the same. In accordance with at least selected embodiments, the present disclosure or invention is directed to novel or improved separators, cells, batteries, and/or methods of manufacture and/or use of such separators, cells, and/or batteries. In accordance with at least certain embodiments, the present disclosure or invention is directed to an improved separator for lead acid batteries and/or improved methods of using such batteries having such improved separators. In addition, disclosed herein are methods, systems and battery separators for enhancing battery life, reducing battery failure, reducing water loss, improving oxidation stability, improving, maintaining, and/or lowering float current, improving end of charge (EOC) current, decreasing the current and/or voltage needed to charge and/or fully charge a deep cycle battery, minimizing internal electrical resistance increases, lowering electrical resistance, increasing wettability, lowering wet out time with electrolyte, reducing time of battery formation, reducing antimony poisoning, reducing acid stratification, improving acid diffusion, and/or improving uniformity in lead acid batteries. In accordance with at least particular embodiments, the present disclosure or invention is directed to an improved separator for lead acid batteries wherein the separator includes one or more improved performance enhancing additives and/or coatings. In accordance with at least certain embodiments, the disclosed separators are useful for deep-cycling applications, for instance in motive machines or vehicles and/or stationary machines or vehicles, such as golf carts, fork trucks, inverters, renewable energy systems and/or alternative energy systems, by way of example only, solar power systems and wind power systems; in particular, the disclosed separators are useful in battery systems wherein deep cycling and/or partial state of charge operations are part of the battery life, even more particularly, in battery systems where additives and/or alloys (antimony being a key example) are added to the battery to enhance the life and/or performance of the battery and/or to enhance the deep cycling and/or partial state of charge operating capability of the battery.

In accordance with at least selected embodiments, the present disclosure is directed to improved lead acid batteries, such as flooded lead acid batteries, improved systems that include a lead acid battery, and/or a battery separator, improved battery separators, improved vehicles including such systems, methods of manufacture or use, or combinations thereof. In accordance with at least certain embodiments, the present disclosure or invention is directed to improved flooded lead acid batteries, improved battery separators, mats, composite separators, laminated separators, positive envelopes, negative envelopes, and/or the like for such batteries, and/or methods of manufacturing, testing, or using such improved flooded lead acid batteries, or combinations thereof. In addition, disclosed herein is a method, system, battery, and/or battery separator for reducing acid stratification, enhancing battery life and performance in a flooded lead acid battery, and in such batteries that operate in a partial state of charge.

BACKGROUND

Enhanced flooded batteries ("EFBs") and absorbent glass-mat ("AGM") batteries have been developed to meet the expanding need for electric power sources in idle start stop applications. EFB systems have similar architecture to traditional flooded lead acid batteries, in which positive and/or negative electrodes are surrounded by a microporous separator and submerged in a liquid electrolyte. AGM systems, on the other hand, do not contain free liquid electrolyte. Instead, the electrolyte is absorbed into a glass fiber mat which is then layered on top of the electrodes. Historically, AGM systems have been associated with higher discharge power, better cycle life, and greater cold cranking amps than flooded battery systems. However, AGM batteries are significantly more expensive to manufacture and are more sensitive to overcharging. As such, EFB systems remain an attractive option for mobile power sources as well as stationary power sources for various markets and applications.

EFB systems can include one or more battery separators which divides, or "separates," the positive electrode from the negative electrode within a lead acid battery cell. A battery separator may have two primary functions. First, a battery separator should keep the positive electrode physically apart from the negative electrode in order to prevent any electronic current passing between the two electrodes. Second, a battery separator should permit an ionic current between the positive and negative electrodes with the least possible resistance. A battery separator can be made out of many different materials, but these two opposing functions have been met well by a battery separator being made of a porous nonconductor. With this structure, pores contribute to ionic diffusion between electrodes, and a non-conducting polymeric network prevents electronic shorting.

An EFB with increased discharge rate and cold cranking amperes or amps ("CCA") would be able to displace AGM batteries. It is known that cold cranking amps are correlated with the internal resistance of the battery. It is therefore expected that lowering internal resistance of an enhanced flooded battery will increase the cold cranking amps rating. As such, there is a need for new battery separator and/or battery technology to meet and overcome the challenges arising from current lead acid battery systems, especially to lower internal resistance and increase cold cranking amps in enhanced flooded batteries.

In order to reduce fuel consumption and generation of tail pipe emissions, auto manufacturers have implemented varying degrees of electrical hybridization. One form of Hybrid Electric Vehicle (HEV) is sometimes referred as the "Micro HEV" or "micro-hybrid." In such Micro HEVs or similar vehicles, an automobile may have an idle start/stop (ISS) function in which the engine may shut off at various points during idle start/stop and/or regenerative braking. Although this increases the fuel economy of the vehicle, it also increases strain on the battery, which must power auxiliary devices (such as air conditioning, media players and the like) while the vehicle is not in motion.

Conventional vehicles (such as automobiles without start/stop capability) may use conventional flooded lead acid batteries such as starting lighting ignition (SLI) lead acid batteries. Because the engine never shuts off during use, power is only drawn from the battery when the engine is cranked. As such, the battery typically exists in a state of overcharge, not in a partial state of charge. For example, such a conventional flooded lead acid battery may exist in a state of charge that is greater than 95% charged, greater than 96%, greater than 97%, greater than 98%, greater than 99%, or even greater than 100% charged, as it is often in a state of overcharge. At overcharge, gas bubbles (for example hydrogen gas bubbles) are generated within the conventional lead acid battery, and these circulating gas bubbles serve to mix the liquid electrolyte (the acid) within the battery.

Start/stop vehicles, on the other hand, continuously draw power from the battery, which is therefore constantly in a state of partial charge. At partial charge, gas bubbles are not generated, and the internal mixing of the electrolyte is substantially reduced, leading to acid stratification within the battery. Thus, acid stratification is a problem within start/stop flooded lead acid batteries and various enhanced flooded batteries, whereas acid stratification simply was not a problem for more conventional or traditional flooded lead acid batteries, which operated in a state of overcharge or total (or close-to-total) charge.

Acid stratification is a term for the process in which denser sulfuric acid is concentrated at the bottom of the battery, leading to a corresponding higher water concentration at the top of the battery. Acid stratification is undesirable within a flooded lead acid battery, such as an enhanced flooded lead acid battery or a start/stop flooded lead acid battery. The reduced levels of acid at the top of the electrode may inhibit uniformity and charge acceptance within the battery system and may increase the variation of internal resistance from top to bottom along the height of the battery. Increased acid levels at the bottom of the battery artificially raise the voltage of the battery, which can interfere with battery management systems, possibly sending unintended/erroneous state of health signals to a battery management system. Overall, acid stratification causes higher resistance along parts of the battery, which may lead to electrode issues and/or shorter battery life. Given that start/stop batteries and/or other enhanced flooded lead acid batteries are expected to become more and more prevalent with hybrid and fully electric vehicles to increase vehicle fuel efficiency and reduce $CO_2$ emissions, solutions for reducing acid stratification and/or for improving acid mixing are greatly needed.

In some instances, acid stratification can be avoided using VRLA (valve regulated lead acid) technology where the acid is immobilized by either a gelled electrolyte and/or by an absorbent glass mat (AGM) battery separator system. In contrast to the freely-fluid electrolyte in flooded lead acid batteries, in VRLA AGM batteries, the electrolyte is absorbed on a fiber or fibrous material, such as a glass fiber mat, a polymeric fiber mat, a gelled electrolyte, and so forth. However, VRLA AGM battery systems are substantially more expensive to manufacture than flooded battery systems. VRLA AGM technology in some instances, may be more sensitive to overcharging, may dry out in high heat, may experience a gradual decline in capacity, and may have a lower specific energy. Similarly, in some instances, gel VRLA technology may have higher internal resistance and may have reduced charge acceptance.

Thus, there is a need to further develop enhanced flooded lead acid batteries, such as enhanced flooded start/stop batteries, that do not undergo acid stratification while in use and/or that exhibit reduced or significantly reduced levels of acid stratification while in use. There is a need for improved enhanced flooded lead acid batteries with improved uniformity and performance in comparison to what has been previously available, and with performance capability that rivals, or even exceeds, what may be found in certain VRLA AGM batteries.

A battery separator is used to separate the battery's positive and negative electrodes or plates in order to prevent an electrical short. Such a battery separator is typically microporous so that ions may pass therethrough between the positive and negative electrodes or plates. Separators can be fashioned from polyolefins, such as polyethylene and polypropylene, wood, paper, rubber, PVC, and fiberglass. In lead acid storage batteries, such as automotive batteries and/or industrial batteries and/or deep cycle batteries, the battery separator is typically a microporous polyethylene separator; in some cases, such a separator may include a backweb and a plurality of ribs standing on one or both sides of the backweb. See: Besenhard, J. O., Editor, Handbook of Battery Materials, Wiley-VCH Verlag GmbH, Weinheim, Germany (1999), ch. 9, pp. 245-292. Some separators for automotive batteries are made in continuous lengths and rolled, subsequently folded, and sealed along the edges (or certain edges) to form pouches or envelopes or sleeves or pockets that receive the electrodes for the batteries. Certain separators, for example, for industrial (or traction or deep cycle storage) batteries are cut to a size about the same as an electrode plate (pieces or leaves).

Separators made from polyolefins, such as polyethylene, typically contain silica to facilitate separator wetting with the hydrophilic electrolyte. In some instances, a hydrophilic material, such as a glass mat, is attached to the separator to assist with wetting and to retain active material coated on the positive electrode.

The electrodes in a lead acid battery are often made up of a lead alloy having a relatively high antimony content. Lead/antimony alloys have advantages both during the manufacturing process of the electrode frames (by way of example only, improvement of the flow characteristics of the molten metal in the molds, greater hardness of the cast electrode frame, etc.) and during use of the battery; particularly in the case of cyclical loads, a good contact between terminal and active material is ensured at the positive electrode in addition to mechanical stability, so that a premature drop in capacity does not occur ("antimony-free" effect) and provides improved cycleability. Additionally, for deep cycle batteries, antimony is often present in the positive grid of the battery.

However, antimony-containing positive electrodes have the disadvantage that antimony can be dissolved in the electrolyte ionically, which then migrates through the separator. Because antimony is nobler than lead, it can be deposited on the negative electrode. This process is described as antimony poisoning. Through a reduction of the overvoltage for hydrogen, antimony poisoning leads to increased water consumption, and thus the battery requires more maintenance. In particular, antimony can catalyze the decomposition of water, lowering charge voltage and increasing the energy necessary to fully recharge the battery, since the water decomposition may consume some of the energy needed to fully recharge that battery. Attempts have already been made to completely or partially replace the antimony in the lead alloy with other alloy components, which, however, has not led to satisfactory results. Overall, the presence of antimony in the positive grid of a deep cycle battery may present a source of reduced cycle life.

U.S. Pat. No. 5,221,587, which is incorporated herein by reference in its entirety, discloses a battery separator containing both plastic and rubber. The rubber was found to delay the rate of antimony poisoning. U.S. Pat. No. 5,221, 587 discloses coating or incorporating rubber on or in a sheet.

For at least certain applications or batteries, there remains a need for improved separators providing for improved cycle life, reduced antimony poisoning, reduced water consumption, reducing float charge current, and/or reduced voltage required to fully recharge the battery. More particularly, there remains a need for improved separators, and improved batteries (such as golf car or golf cart batteries) comprising an improved separator, which provides for enhancing battery life, reducing battery failure, reducing water loss, improving oxidation stability, improving, maintaining, and/or lowering float current, improving end of charge (EOC) current, decreasing the current and/or voltage needed to charge and/or fully charge the battery, such as a deep cycle battery, minimizing internal electrical resistance increases, lowering electrical resistance, increasing wettability, lowering wet out time with electrolyte, reducing time of battery formation, reducing antimony poisoning, reducing acid stratification, improving acid diffusion, and/or improving uniformity in lead acid batteries.

In EFB systems, the electrodes are comprised of a lead alloy. During the manufacturing process of such an EFB, a paste is applied and cured on a grid to form the electrodes. The paste may comprise one or more of carbon black, barium sulfate, lignosulfonate, sulfuric acid, and water. The curing process changes the paste to a mixture of lead sulfates, which upon the initial charging of the battery becomes an electrochemically active material. The paste on positive electrodes is known as positive active material ("PAM"). Similarly, active material on the negative electrode is known as negative active material ("NAM"). During charging and discharging cycles of the batteries, the electrodes undergo expansion and contraction. Over time, this distortion of the electrodes causes the active material to shed and physically separate from the electrode. As more and more active material sheds from the electrode, that electrode becomes less effective and the battery's performance and life are reduced. As such, there is a need for new battery separator and/or battery technology to meet and overcome the challenges arising from current lead acid battery systems, especially to prevent or impede the shedding of active material from the electrodes in enhanced flooded lead acid batteries.

SUMMARY

The details of one or more embodiments are set forth in the descriptions below. Other features, objects, and advantages will be apparent from the description and from the claims. In accordance with at least selected embodiments, the present disclosure or invention may address the above issues or needs. In accordance with at least certain objects, aspects, or embodiments, the present disclosure or invention may provide an improved separator and/or battery which overcomes the aforementioned problems, for instance by providing batteries having improved retention of active material on electrodes, such improved retention of active material, in certain embodiments, provided by an improved separator comprising an improved retention mat, such as an improved PAM retention mat. While specific embodiments disclosed herein are directed to lead acid battery separators for retaining PAM, they may also be used for retaining NAM.

One embodiment of the present invention provides a lead acid battery separator having a porous membrane, with the membrane or web having a plurality of ribs thereon. The ribs may be on one or both of the positive electrode facing surface and the negative electrode facing surface. The inventive separator is further provided with a fibrous mat on the positive electrode facing surface.

In accordance with at least selected embodiments, aspects or objects, the present disclosure or invention is directed to or may provide novel or improved separators, battery separators, flooded battery separators, enhanced flooded battery separators, fibrous mats, batteries, cells, and/or methods of manufacture and/or use of such separators, battery separators, fibrous mats, enhanced flooded battery separators, cells, and/or batteries. In accordance with at least certain embodiments, the present disclosure or invention is directed to novel or improved enhanced flooded lead acid battery separators for starting lighting ignition ("SLI") batteries, fibrous mats, flooded batteries for deep cycle applications, and/or enhanced flooded batteries, and/or systems, vehicles, and/or the like including such separators, mats or batteries, and/or improved methods of making and/or using such improved separators, mats, cells, batteries, systems, vehicles, and/or the like. In accordance with at least certain embodiments, the present disclosure or invention is directed to an improved separator for enhanced flooded batteries and/or improved methods of making and/or using such batteries having such improved separators. In accordance with at least selected embodiments, the present disclosure or invention is directed to separators, flooded battery separators, preferably or particularly separators for enhanced flooded batteries having reduced electrical resistance and/or increased cold cranking amps. In addition, disclosed herein are methods, systems and battery separators for enhancing battery life, reducing water loss, reducing internal resistance, increasing wettability, reducing acid stratification, improving acid diffusion, improving cold cranking amps and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, increased porosity, increased void volume, amorphous silica, higher oil absorption silica, higher silanol group silica, retention and/or improved retention of active material on electrodes, and/or any combination thereof.

In accordance with at least certain embodiments, the present disclosure or invention is directed to improved flooded lead acid batteries, improved battery separators, mats, composite separators, laminated separators, positive envelopes, negative envelopes, and/or the like for such batteries, and/or methods of manufacturing, testing, or using such improved flooded lead acid batteries, or combinations thereof.

In accordance with at least certain embodiments, aspects and/or objects, the present invention, application, or disclosure may provide solutions, new products, improved products, new methods, and/or improved methods, and/or may address issues, needs, and/or problems of PAM shedding, NAM shedding, electrode distortion, active material shedding, active material loss, and/or physical separation, electrode effectiveness, battery performance, battery life, and/or cycle life, and/or may provide new battery separators, new battery technology, and/or new battery methods and/or systems that address the challenges arising from current lead acid batteries or battery systems, especially new battery separators, new battery technology, and/or new battery methods and/or systems adapted to prevent or impede the shedding of active material from the electrodes in enhanced flooded lead acid batteries, or in other batteries such as other flooded batteries, AGM batteries, Partial State of Charge (PSoC) batteries, ISS batteries, Energy Storage System (ESS) batteries, or the like.

BRIEF DESCRIPTION OF THE DRAWINGS

FIG. 12A depicts Separator Layer A and FIG. 12B depicts Separator Layer B, both according to various embodiments of the present disclosure, which are microporous membranes made having one or more broken rib patterns thereon, with Separator Layer B having one or more ribs having one or more tapered longitudinal ends at a particular angle (or angle within a particularly preferred range).

DETAILED DESCRIPTION

Figure 1A:
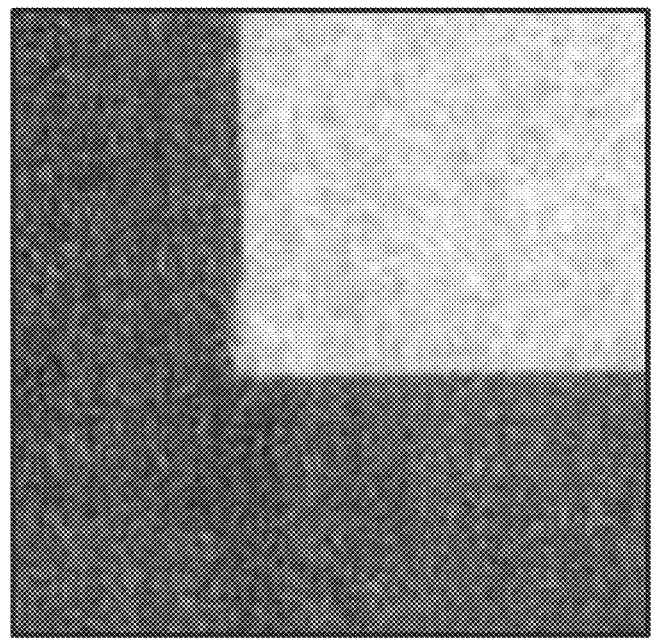
FIGS. 1A and 1B are photographs of an exemplary fibrous mat as described in the present disclosure.
Figure 1B:
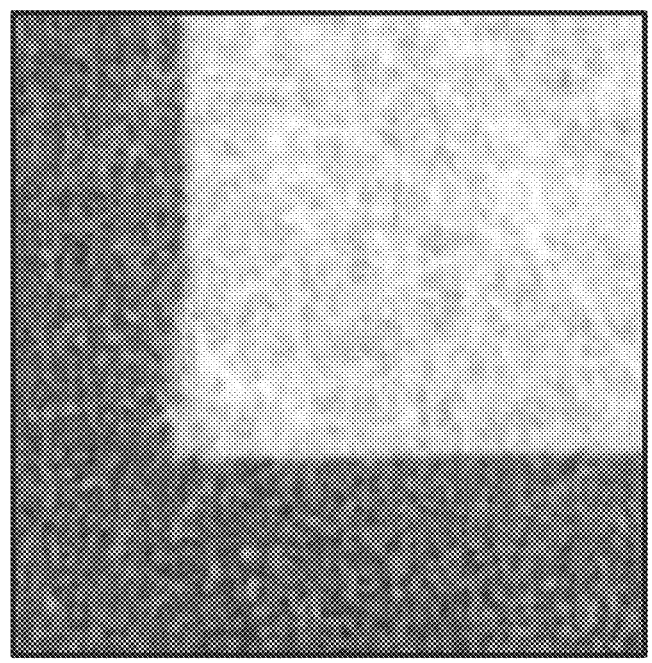

With reference now to FIGS. 1A and 1B, photographs of an exemplary embodiment of a fibrous mat are shown.

Figure 1C:
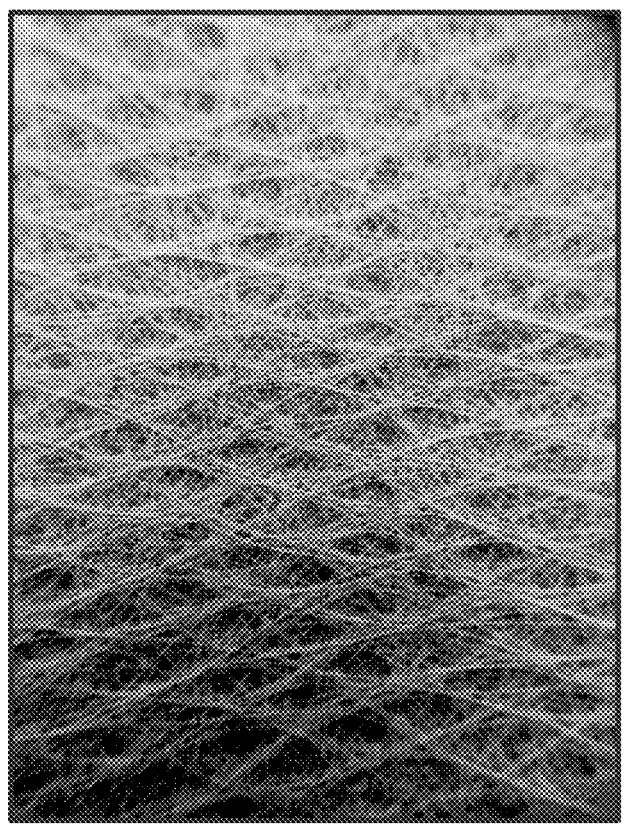
FIGS. 1C and 1D are higher resolution photographs of the mat of FIGS. 1A and 1B, with FIG. 1D taken at an oblique angle to the mat lying flat.
Figure 1D:
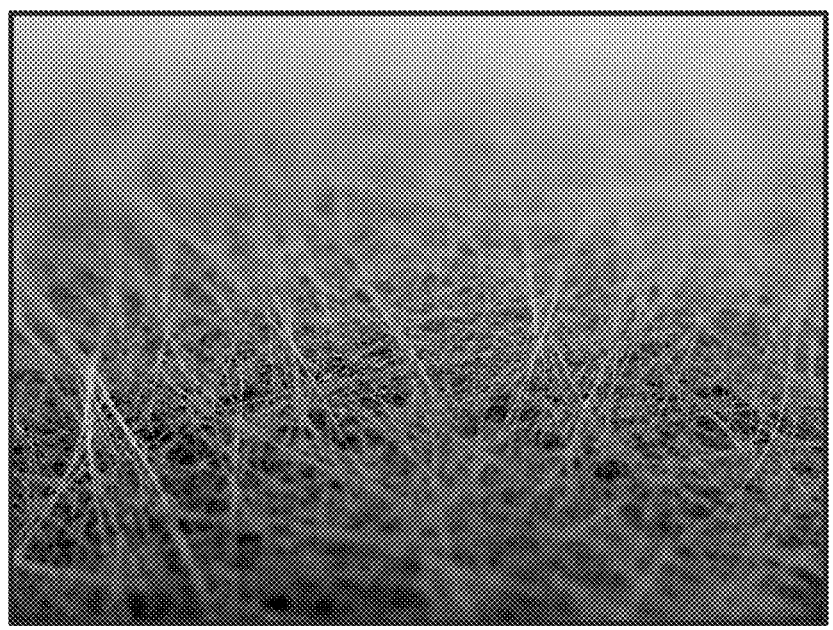

FIGS. 1C and 1D are higher resolution photographs of an exemplary embodiment of a fibrous mat. The fibrous mat may be nonwoven, a fleece, a mesh, or any combination of layers thereof. The fibrous mat may be a single layer, double layer, or other multi-layer mat. An exemplary nonwoven mat may have a thickness in the range of approximately 100 µm to approximately 900 µm, and preferably in the range of approximately 200 µm to approximately 450 µm. FIGS. 1C and 1D show a pattern of bundled fibers. This may be accomplished during the forming of the mat, as the fiber carrier fluid is drained away, the fibers may collect at certain low points in the draining mesh. In addition, the mat may possess combed fibers.

A preferred fibrous mat composition may be, for example, glass fiber, synthetic fiber, or any combination thereof. An exemplary embodiment of a fibrous mat may be 5% to 25% synthetic fiber, with the remainder being glass and/or binder. However, the mat may be entirely glass or entirely synthetic. Such examples of synthetic fibers may be polypropylene, polyester, such as polyethylene terephthalate ("PET"), acrylic, other plastics, or any combination thereof. Further, the fiber composition may be a polymer, homopolymer, or copolymer, or a mix of fibers having a combination of these compositions. Whatever the composition of the fibrous mat, it is preferable that it be resistant to the acid electrolyte of the lead acid battery. These materials tend to be hydrophobic, thus causing gas entrapment. Therefore, a surfactant coating as generally described herein may be added.

The fibrous mat may further have fillers, such as particulate silica to increase the surface area and reduce pore size. The fibrous mat composition may further have soluble fibers. The fibrous mat may also include a gelling agent to assist in resisting acid stratification. In addition, the fibrous mat may include a wetting agent additive or coating as generally described hereinbelow.

An exemplary fibrous mat may have a preferred air permeability in the range of approximately 1500 l/m²s to approximately 2500 l/m²s.

An exemplary fibrous mat may have a pore size that is preferably less than approximately 4.0 µm to 5.0 µm (as measured as an effective diameter). The fibrous mat pore size is preferably smaller than the grain size of the active material used on the associated electrode. Table 1, below, compares pore size in µm² of a fibrous mat in accordance with the present invention to that of a conventional glass mat.

TABLE 1

|  | Exemplary Fibrous Mat of the Invention | Conventional Glass Mat |
| --- | --- | --- |
| Mean | 1332.65 µm² | 6896.95 µm² |
| Standard Deviation | 1573.57 µm² | 6461.03 µm² |
| Sample Size | 63 | 29 |

An exemplary fibrous mat may have a preferred electrical resistance ("ER") in the range of approximately 6 mΩ·cm² to approximately 14 mΩ·cm², and preferably less than 14, or less than 13, or less than 12, or less than 11 mΩ·cm².

An exemplary fibrous mat may have a preferred area weight or basis weight in the range of approximately 50 g/m² to about 100 g/m², in some embodiments, 50 g/m² to approximately 65 g/m².

An exemplary fibrous mat may have a preferred binder content in the range of approximately 15% by weight to approximately 21% by weight.

An exemplary fibrous mat may have a preferred tensile strength in the machine direction (MD) of approximately 200 N/50 mm, and a preferred tensile strength in the cross-machine direction (CMD) of approximately 150 N/50 mm.

Furthermore, the fibers may be solid or hollow, and the cross-sectional shape of the fibers may be round, circular, oval or oblong, kidney-shaped, dog-bone shaped, race-track shaped, polygonal shaped, or any combination thereof. In addition, exemplary fibers may have multiple components in a side-by-side configuration, or a sheath and core configuration, or an islands-in-the-sea configuration. Moreover, the sheath and core configuration may take on any of the above shapes, and the core may be centered or eccentric.

Figure 1E:
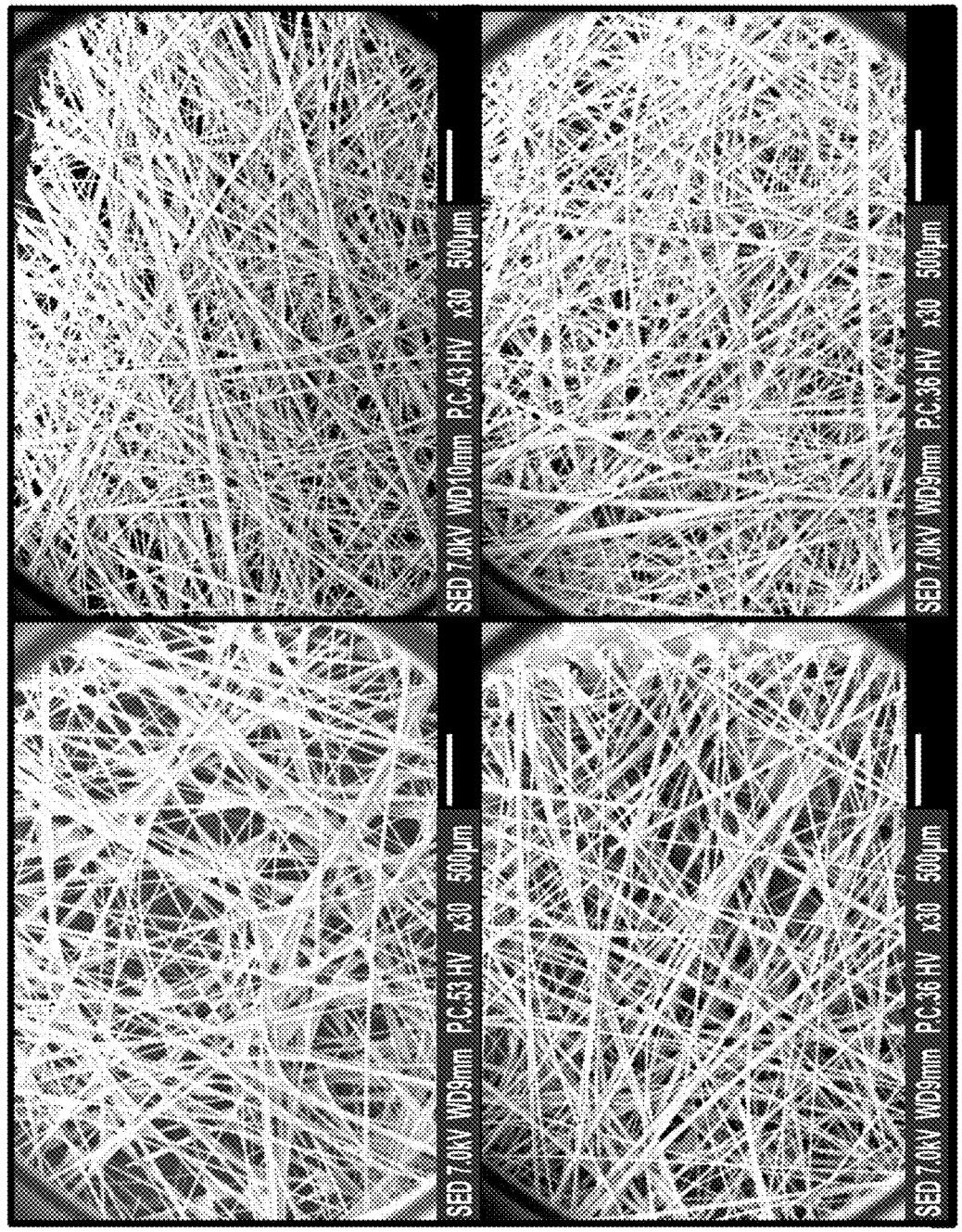
FIG. 1E shows SEM images at a low magnification comparing an exemplary fibrous mat to that of a conventional glass mat.

Turning now to FIG. 1E shows four SEM images at a low magnification taken from two separate locations of an exemplary fibrous mat and two separate locations of a conventional glass mat. The images show that the exemplary fibrous mat possesses a more densely packed web of fibers than the conventional glass mat. Further, the fibers and open areas of the exemplary fibrous mat are smaller than that of a conventional glass mat.

Figure 1F:
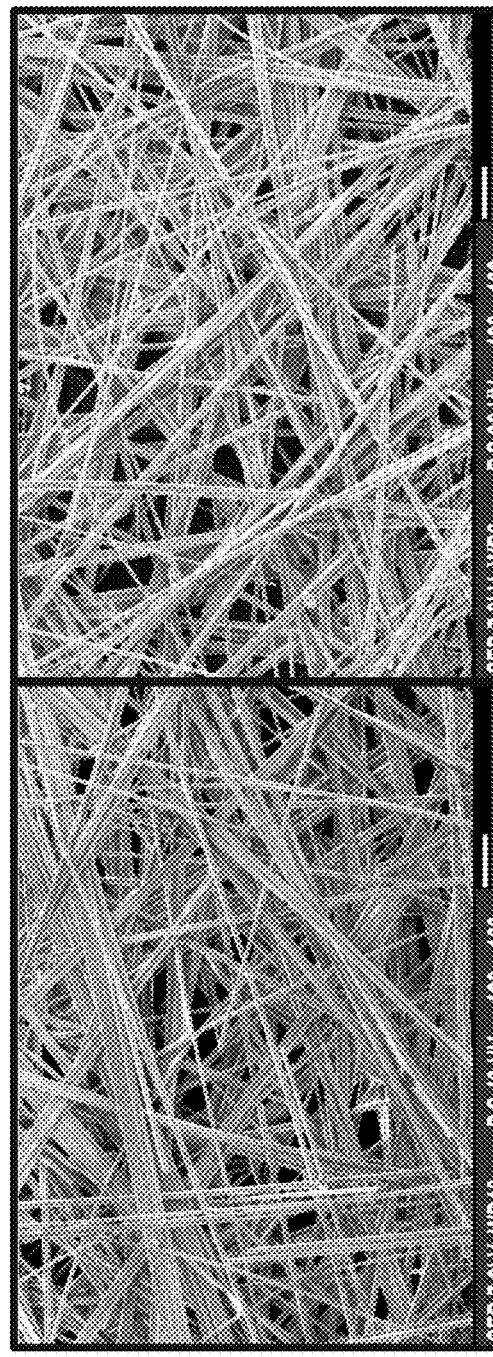
FIGS. 1F-1H are SEM images of an exemplary fibrous mat as described in the present disclosure.
Figure 1F:
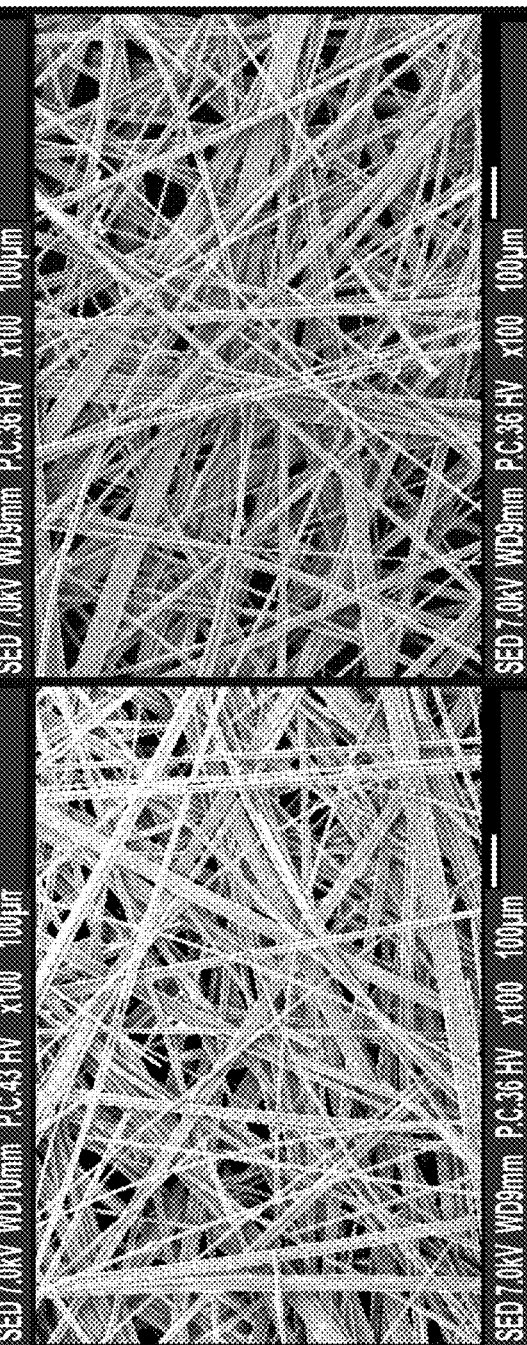

In FIG. 1F, SEM images were acquired from samples taken from two separate locations and then two separate areas from each sample location. This was done to avoid any area bias. The images were taken at a higher magnification than that of FIG. 1E. These images further show the packing density of the fibers and also show some bundling of the fibers, likely due to the binder used and its content. Fibrous mats useful in various embodiments described herein may include bunches or bundles of fibers, such as bunches or bundles of glass fibers and/or synthetic fibers. Such bunches or bundles, in certain embodiments, may be twisted before the fibers are bonded together. In such embodiments, the twisting may occur and binder may be applied to hold such twisting in place. In such embodiments, separators comprising fibrous mats comprising bunches or bundles of fibers may exhibit increased strength compared to separators comprising conventional mats; similarly, where fibers are twisted, such separators comprising such fibrous mats may exhibit even more significant increases in strength compared with separators comprising conventional mats. When a wet-laid process is used to make such a fibrous mat according to various preferred embodiments defined herein, composite fiber bundles may be produced, where such composite fiber bundles comprise glass fiber as well as synthetic polymer fiber, by way of example only, polyester fiber or PET fiber.

An exemplary fibrous mat may have a synthetic fiber diameter of approximately 7.2 µm (±0.5 µm) with confidence limits of ±95%. Table 2, below, compares fiber diameter in µm of a fibrous mat in accordance with the present invention to that of a conventional glass mat.

TABLE 2

|  | Exemplary Fibrous Mat of the Invention | Conventional Glass Mat |
| --- | --- | --- |
| Mean | 7.2408 µm | 13.83 µm |
| Standard Deviation | 1.9741 µm | 1.2103 µm |
| Sample Size | 66 | 37 |

Additionally, the fibrous mat may be formed with bundled fibers either prior to forming the mat or while forming the mat. The bundles may be combed or twisted with multiple fibers having different material compositions, different cross-sectional shapes, different fiber diameters, and any combination thereof. The bundles may be laid in a patterned orientation, randomly deposited, or a combination thereof. The bundled fibers may be laid on and/or within a randomly laid nonwoven or fibrous mat layer. The resulting fibrous mat may therefore have a corrugated surface or a non-corrugated surface, or a combination thereof. FIGS. 1C and 1D are photographs of an exemplary fibrous mat having a corrugated surface. The bundles may also form during production of the mat. The bundles may form simply by the profile of the carrier wires or surfaces used in the mat production. Further, the mat may be laid in two separate processes. For instance, the bundles may be formed with a water insoluble binder and then a second layer of nonwoven fibers may be laid down to hold the fibers together. The bundles may be deposited on either or both surfaces of the mat.

Figure 1G:
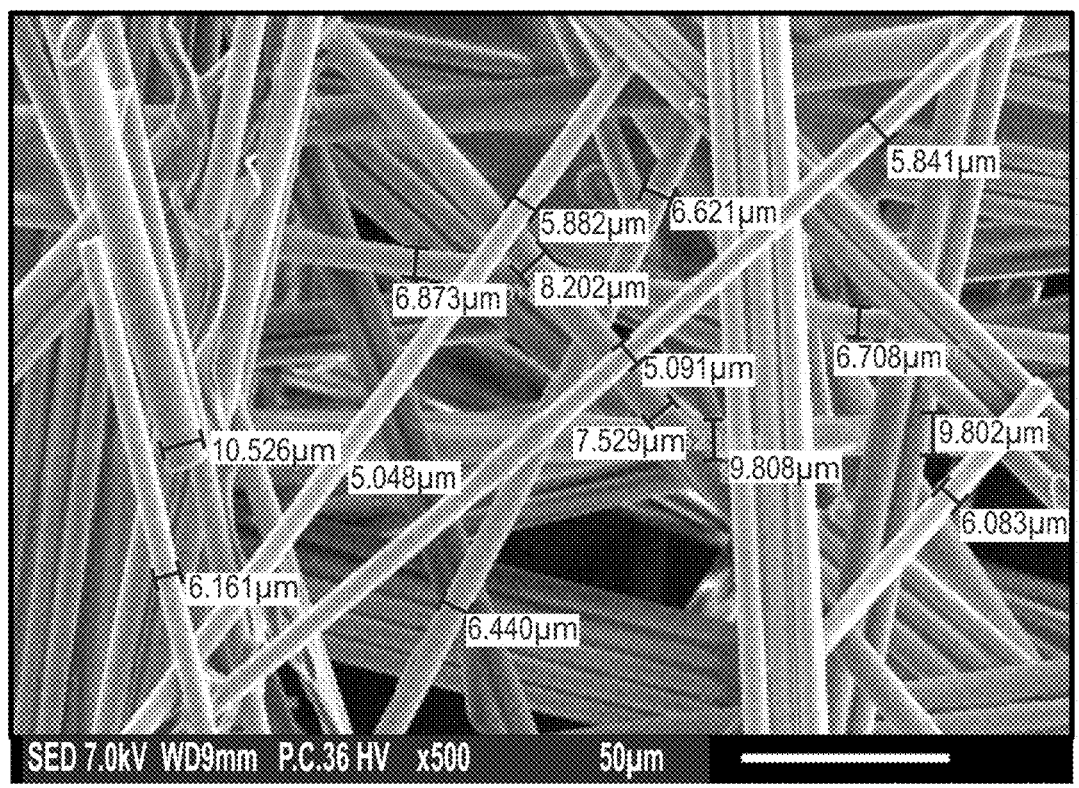
Figure 1H:
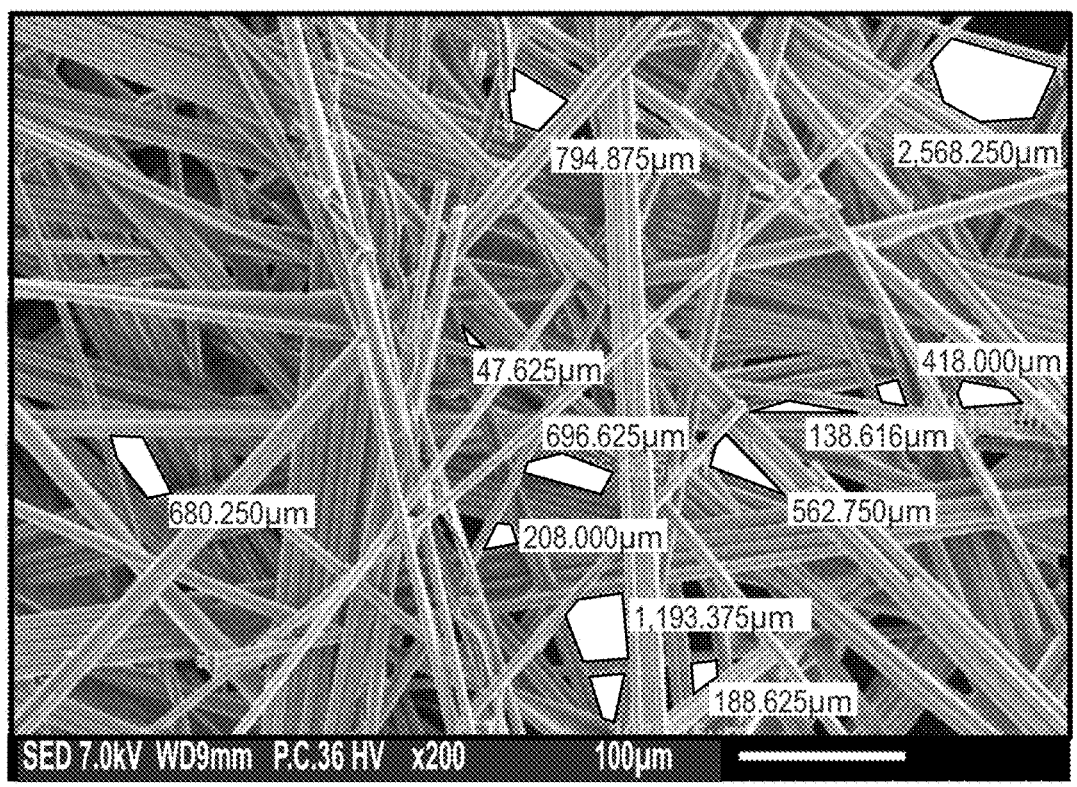

FIG. 1G shows an image used to measure fiber diameter of an exemplary fibrous mat, as taken by the linear distance across individual fibers, fibers in bundles were not measured and two diameters were taken of each measured fiber (if possible). The data from FIG. 1G is shown in Table 1, above. FIG. 1H is an image used to measure pore size of the fibrous mat. The data from FIG. 1H is shown in Table 2, above.

Figure 2A:
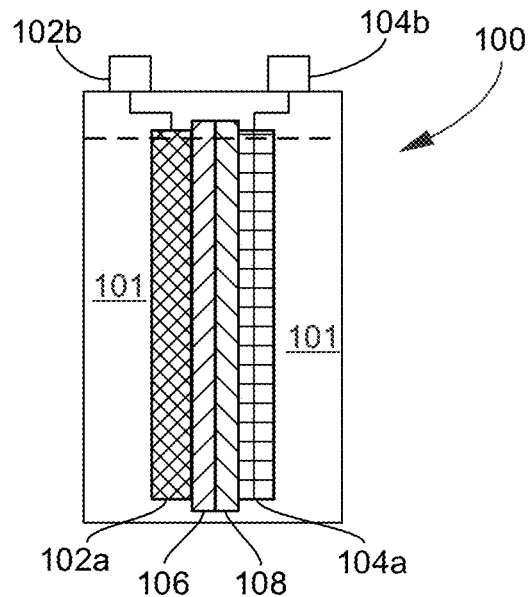
FIGS. 2A and 2B are views of flooded lead acid batteries incorporating exemplary embodiments of separator assemblies with an exemplary fibrous mat.
Figure 2B:
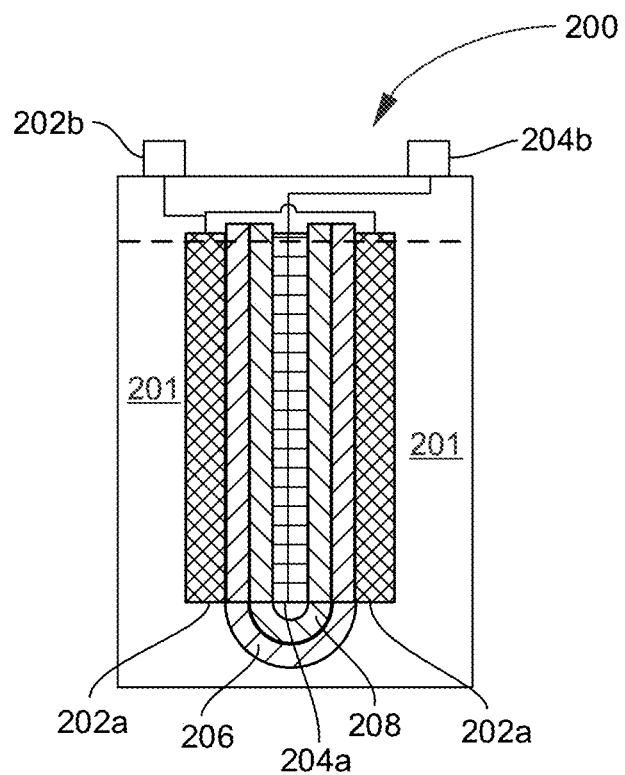
Figure 3A:
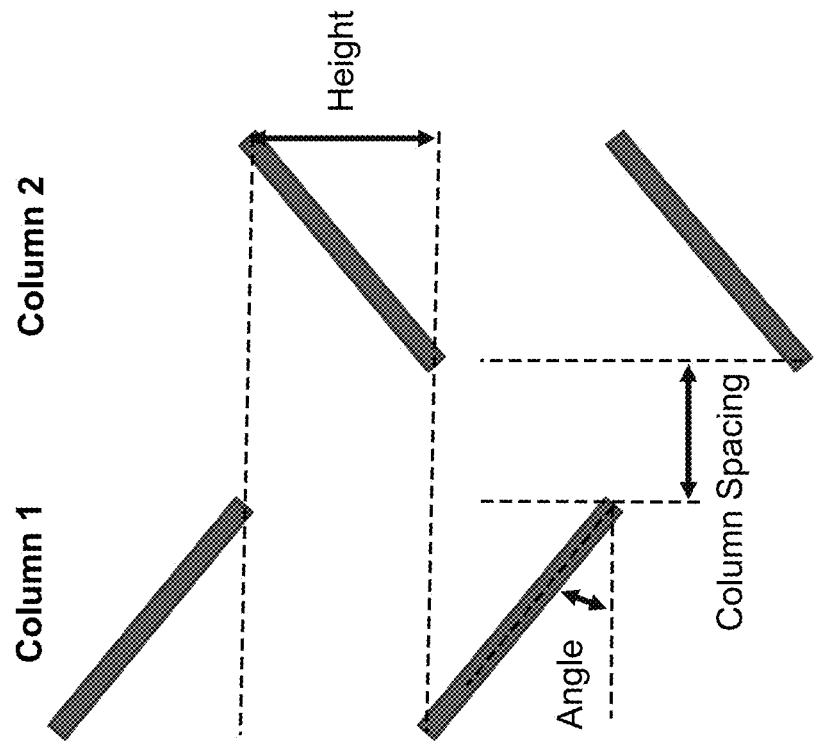
FIGS. 3A-3F depict variables of broken rib patterns according to exemplary embodiments of the present disclosure.
Figure 3B:
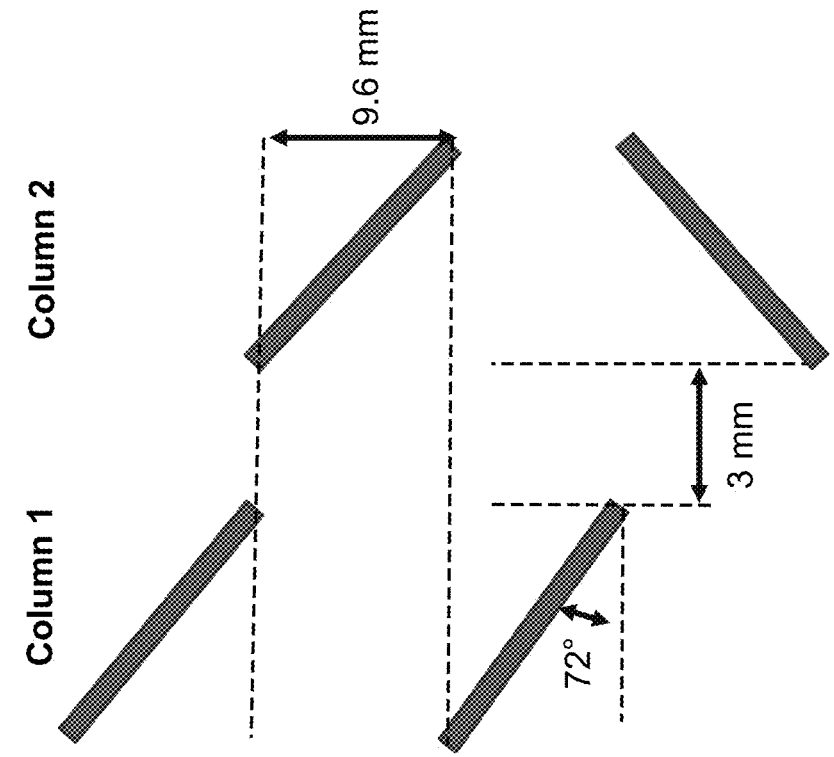
Figure 3C:
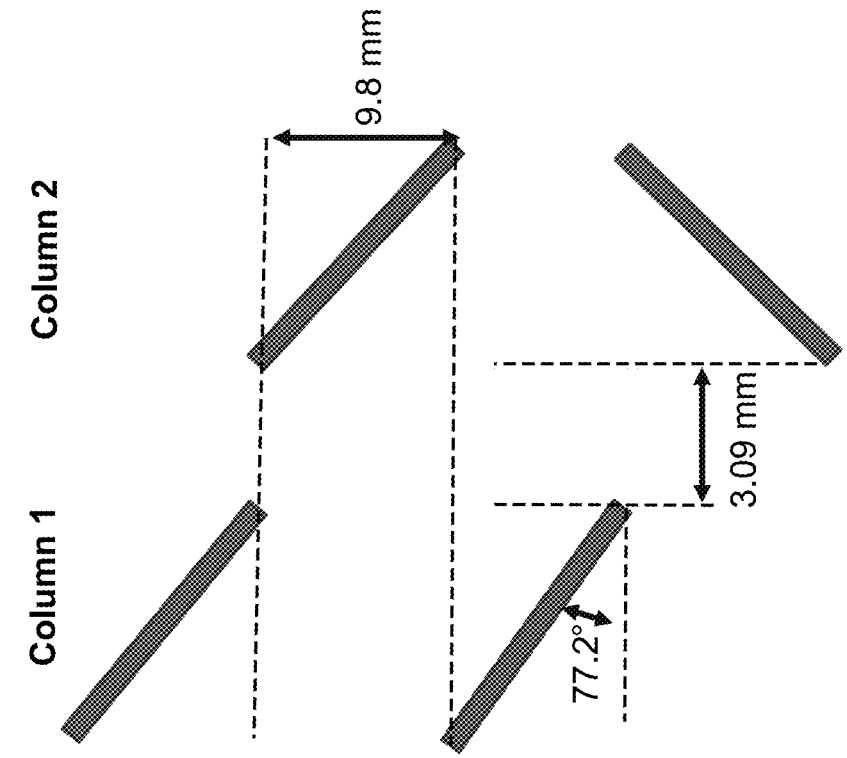
Figure 3D:
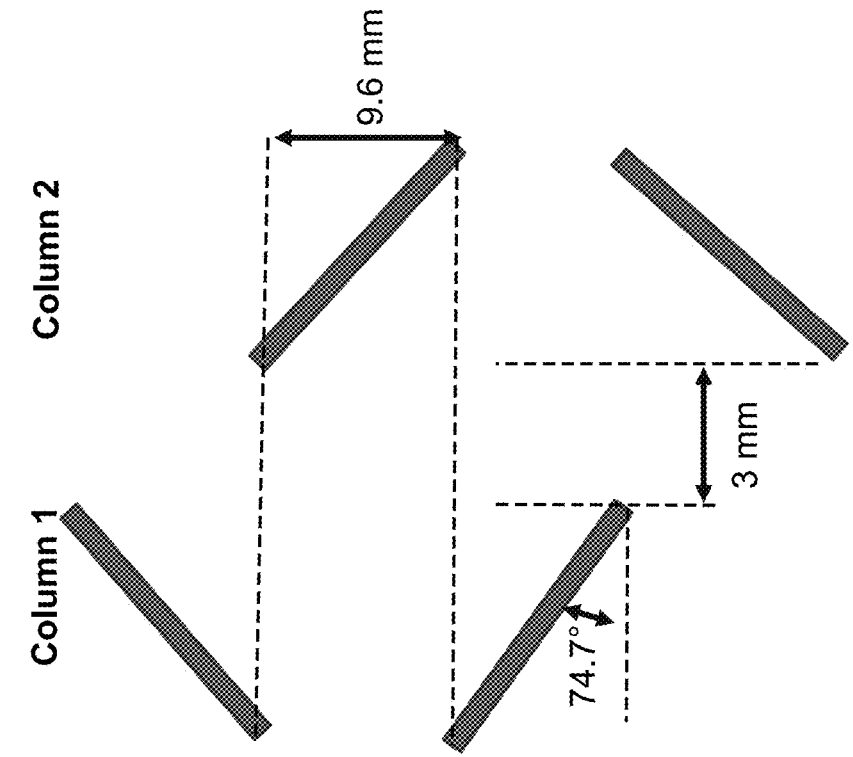
Figure 3E:
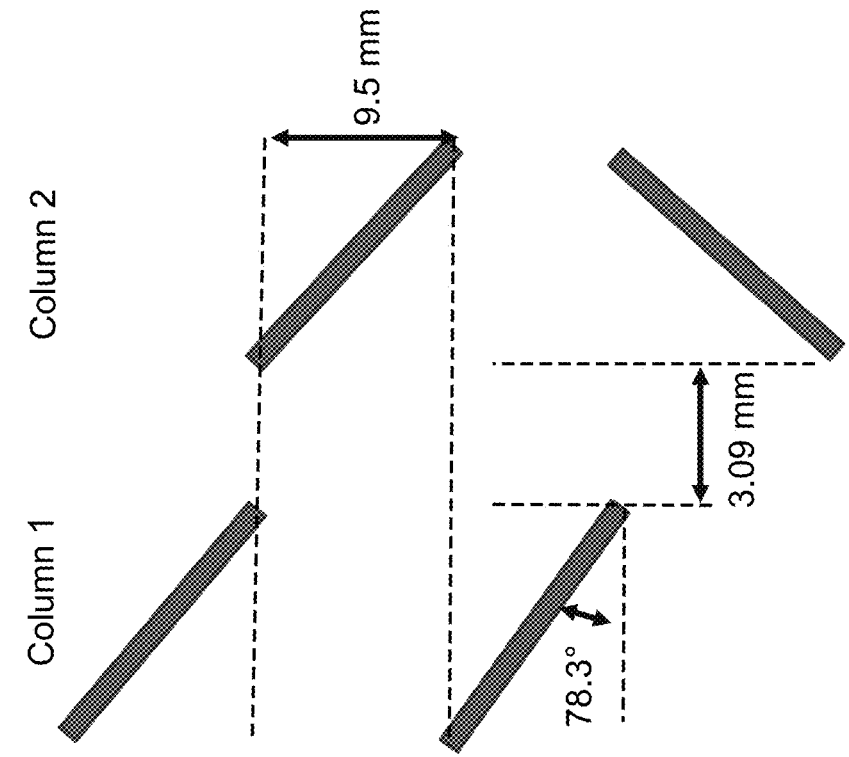
Figure 3F:
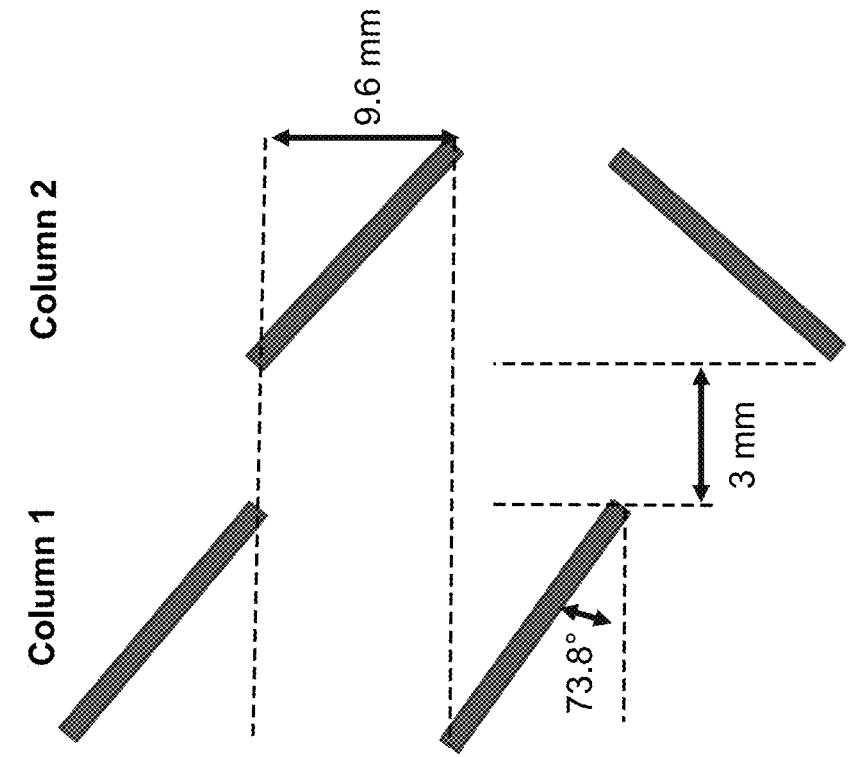
Figure 4C:
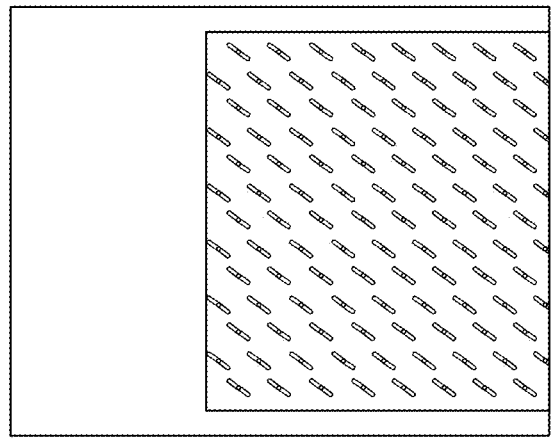
FIGS. 4A-4G illustrate battery separators with broken ribs according to exemplary embodiments of the present disclosure and as defined in the patterns shown therein.
Figure 4B:
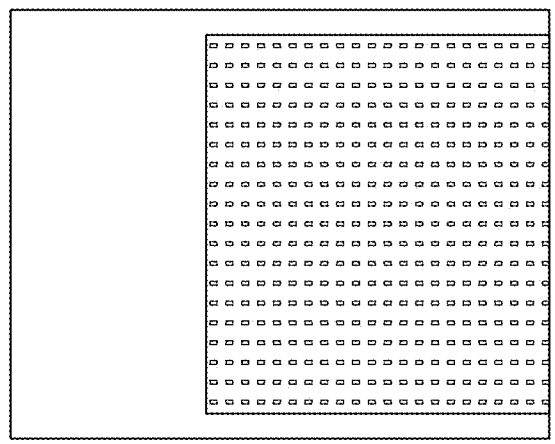
Figure 4A:
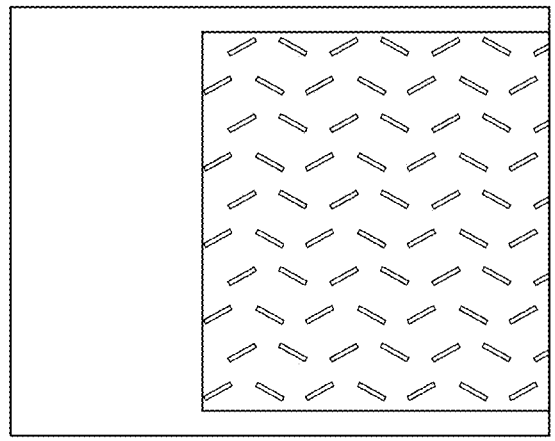
Figure 4D:
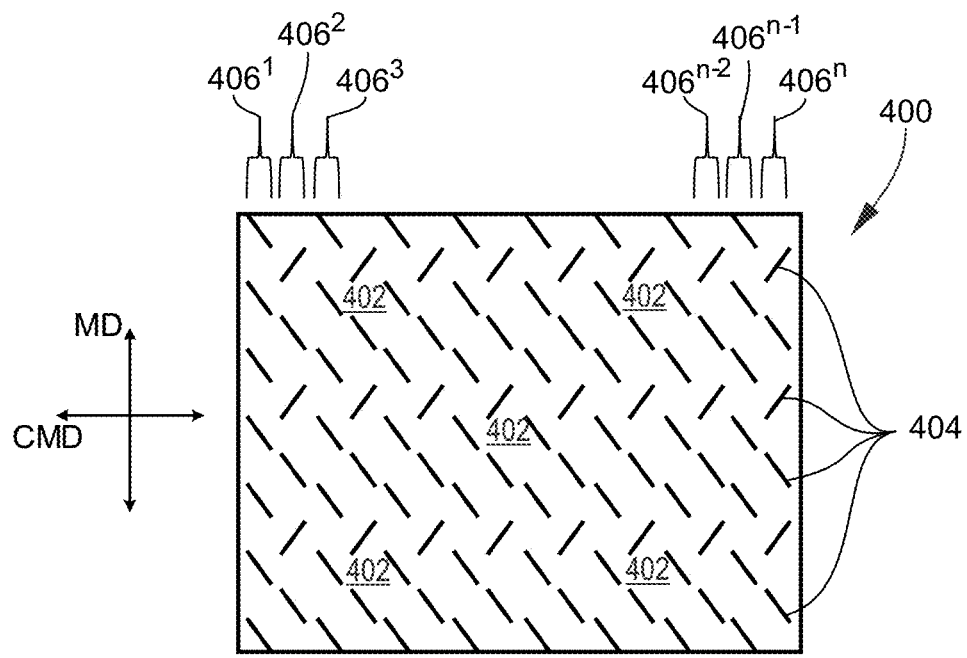
Figure 4E:
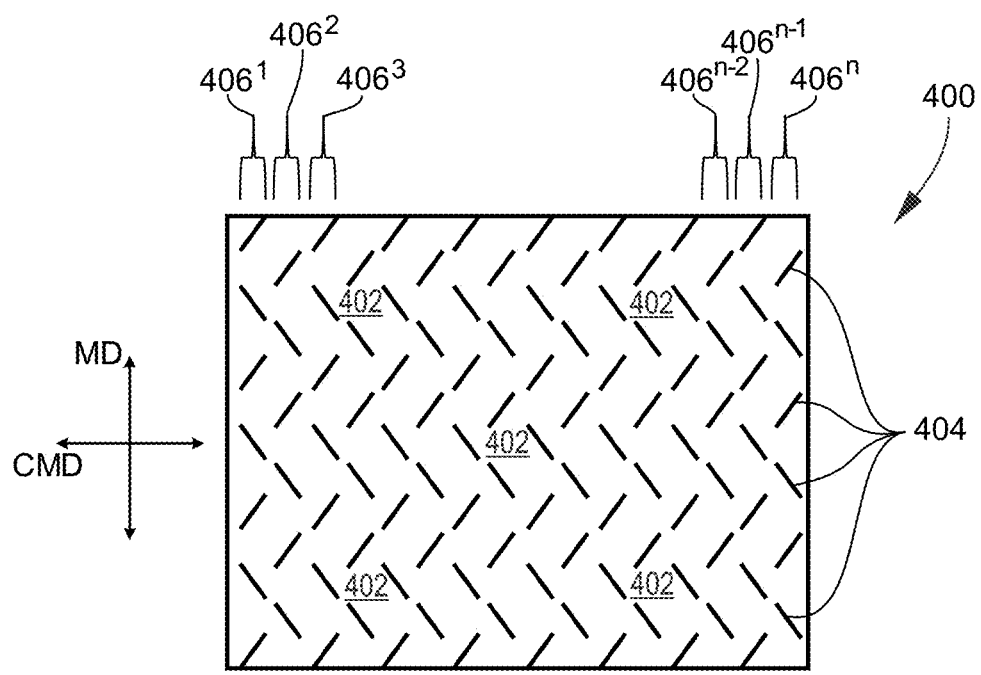
Figure 4F:
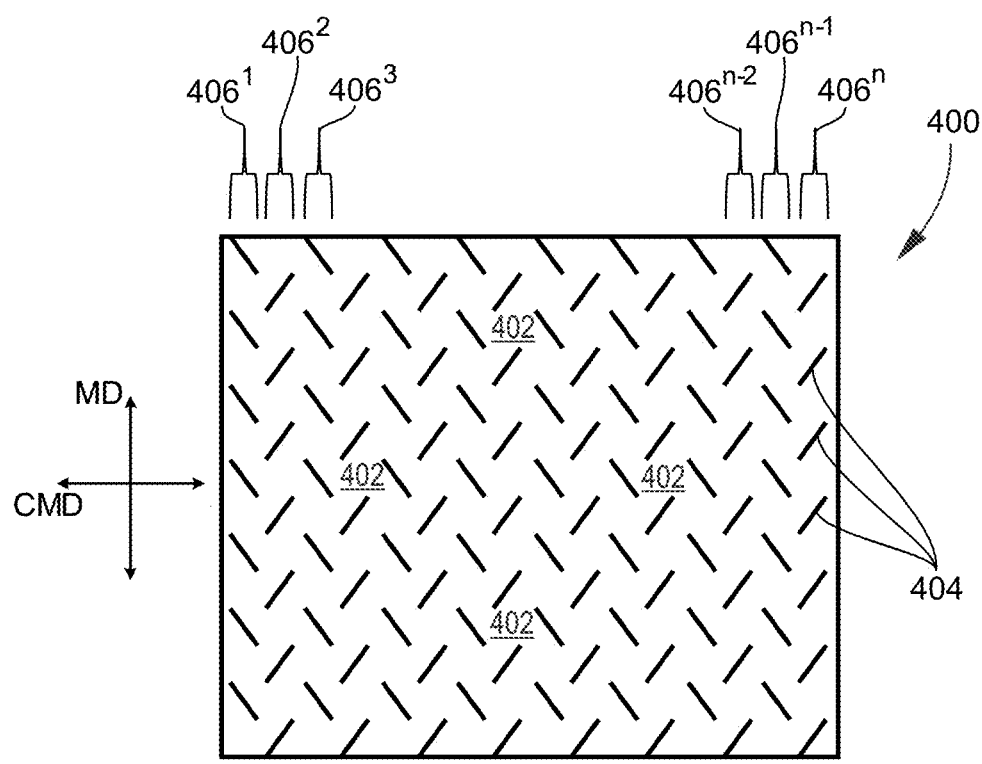
Figure 4G:
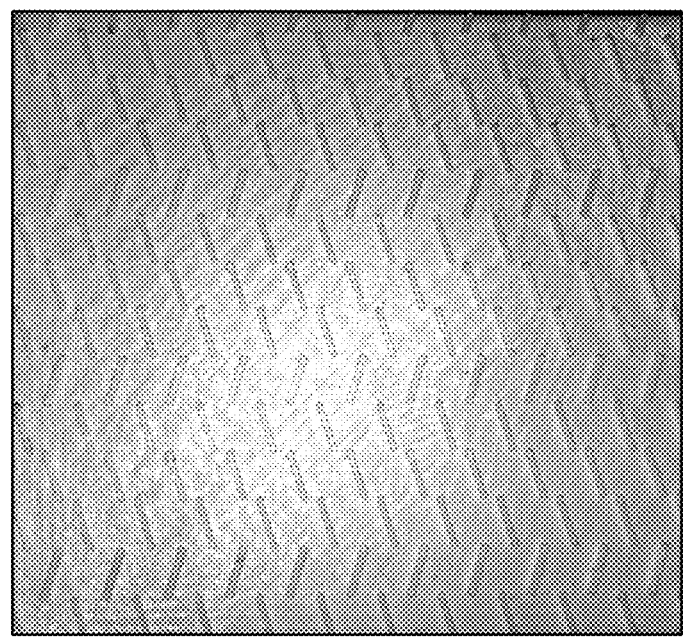

An exemplary flooded lead acid battery may typically be composed of one or more battery cells, with each cell in turn typically having one or more positive and negative electrodes. The electrodes may be configured as a cast or stamped plate or grid. The electrodes may even be configured as cylinders or tubes. A separator is further spaced between each positive and negative electrode(s). In the present disclosure, a separator and fibrous mat is interposed between each electrode. As an example, FIG. 2A depicts a battery 100 having a single cell and a single negative electrode 102a and a single positive electrode 104a. However, it is appreciated that a typical lead acid battery contains multiple electrodes with an alternating series of positive and negative electrodes. The negative electrode 102a is electrically coupled to a negative battery terminal or post 102b. Likewise, the positive electrode 104a is electrically coupled to a positive battery terminal or post 104b. FIG. 2B is similar to FIG. 2A, except it possesses two negative electrodes 202a. The electrodes 102a, 104a, 202b, 204b are typically lead or a lead alloy. Exemplary lead alloys typically contain antimony (Sb), calcium (Ca), tin (Sn), copper (Cu), bismuth (Bi), combinations thereof, and the like.

Turning to FIG. 2A, an exemplary flooded lead acid battery 100 is depicted with a single negative electrode 102a and a single positive electrode 104a, each of which are electrically coupled to a negative terminal or post 102b and a positive terminal or post 104b, respectively. The terminals 102b, 104b are disposed on an outer surface of the battery 100 and typically extend from the top of the battery 100. It is appreciated that a typical flooded lead acid battery 100 will possess more than two electrodes. However, only two are shown in this example for the sake of simplicity. The exemplary battery 100 is further provided with and substantially filled with an electrolyte 101, with the dashed line indicating the fill line of the electrolyte 101. In the exemplary embodiments, the electrodes and separator assembly are substantially submerged within the electrolyte. The electrolyte 101 is typically a sulphuric acid ($H_2SO_4$) with a specific gravity of between approximately 1.20-1.30, and preferably between approximately 1.26-1.28. It is appreciated that any preferred range of the specific gravity depends upon the application of the battery.

Remaining with FIG. 2A, an exemplary separator assembly is disposed between the electrode(s) and is provided with a separator layer 106 (such as a microporous membrane separator layer) and an exemplary fibrous mat 108, with the separator layer 106 adjacent to the negative electrode 102a and the fibrous mat 108 disposed adjacent to the positive electrode 104a. For the purposes of explaining the invention, the separator layer 106 and the fibrous mat 108 together may collectively be referred to as a separator assembly however it is appreciated that they may or may not be joined together or laminated. It is also appreciated that the fibrous mat 108 may be unattached to anything, or may be attached or mounted to an electrode on the outer surface of the active material or incorporated in a pasting paper applied to an electrode, or may be pressed against the electrode active material in some fashion, or any combination thereof. It is further appreciated that the fibrous mat 108 may alternatively be disposed between the negative electrode 102a and the separator layer 106, or there may be a fibrous mat on both sides of the separator layer 106. It is envisioned by the inventors that the fibrous mat will prevent or slow the process of shedding or detaching of the active material from the electrode that it is adjacent to, whether the active material is PAM or NAM.

As shown in FIG. 2A, the separator layer 106 and fibrous mat 108 may be provided as leaves interlaid between electrodes. The separator layer 106 is preferably larger in lateral and longitudinal dimensions than that of the electrodes 102a, 104a, (i.e., the separator layer 106 is wider and taller than the electrodes 102a, 104a). The fibrous mat 108 may extend from lateral end to lateral end of the separator layer 106, or from end rib to end rib (ribs not shown). Furthermore, the separator layer 106 may simply be flat and possess no ribs, or may be embossed.

Turning to FIG. 2B, an exemplary flooded lead acid battery 200 is depicted with two negative electrodes 202a and a single positive electrode 204a disposed therebetween, each of which are electrically coupled to a negative terminal or post 202b and a positive terminal post 204b, respectively. It is appreciated that a typical flooded lead acid battery will possess more than three electrodes. However, only three are shown in this example for the sake of simplicity. The exemplary flooded lead acid battery 200 is further provided with and substantially filled with an electrolyte 201 as generally described herein. The dashed line indicates the fill line of the electrolyte 201, with the electrodes and separator assembly substantially submerged therein.

Remaining with FIG. 2B, an exemplary separator assembly comprising an envelopable separator layer 206 and envelopable fibrous mat 208 are illustrated enveloping the positive electrode 204a, with the separator layer 206 enveloping the fibrous mat 208. The separator layer 206 is preferably adjacent to both negative electrodes 202a, with the fibrous mat 208 preferably adjacent to the positive electrode 204a and between the separator layer 206 and positive electrode 204a. It is appreciated that the separator layer 206 and fibrous mat 208 may or may not be joined together or laminated as one unit. It is further appreciated that the fibrous mat 208 may be unattached to anything, or may be attached or mounted to the electrode on the outer surface of the active material or incorporated in a pasting paper applied to the electrode. It is also appreciated that the fibrous mat 208 may alternatively be disposed between the negative electrodes 202a and the separator layer 206, with the fibrous mat 208 enveloping the separator layer 206. There may also be a fibrous mat on both sides of the separator layer 206. It is envisioned by the inventors that the fibrous mat will prevent or slow the process of shedding or detaching of the active material from the electrode that it is adjacent to, whether the active material is PAM or NAM.

As stated, an exemplary separator assembly comprising the separator layer 206 and fibrous mat 208 combination may be envelopable. The lateral sides of the combination may be sealed together as a continuous or intermittent seam. Such means of sealing are well known to those skilled in the art. In addition, the bottom fold of the envelope may be closed, or have one or more openings of a length less than that of the envelope width. The fibrous mat 208 may extend from lateral end to lateral end of the separator layer 206, or from end rib to end rib (ribs not shown). Furthermore, the enveloping separator layer 206 may simply be flat and possess no ribs.

Some other exemplary embodiments of separator assembly configurations include: a negative or positive electrode envelope; a negative or positive electrode sleeve, a negative or positive electrode hybrid envelope (a variation on a standard envelope); both plates could be enveloped or sleeved, and any combination thereof. In addition, various separators of the present disclosure may include a separator layer (such as separator layer 106), a fibrous mat (such as fibrous mat 108), as well as a glassmat (not shown).

The fibrous mat 108, 208 may simply be disposed adjacent to the separator layer 106, 206, or it may be joined, attached, or laminated to the separator layer 106, 206 in some fashion. Several means of attaching the fibrous mat 108, 208 to the separator layer 106, 206 are known to those skilled in the art. Such means may include, for example, bonding the various layers together by adhesive, ultrasonic welding or sealing, or ultrasonic sewing. Preferably an adhesive such as an acrylate or polyethylene hot melt is used to improve bonding between the microporous polymer layer and the fibrous layer. The adhesive is preferably applied between the layers of the separator in the form of individual spots or continuous stripes. If the separator layer 106 and fibrous mat 108 are laminated, then the rib (not shown) spacing may be farther apart as compared to a separator layer not laminated with a fibrous mat as the fibrous mat will provide extra support to the separator layer thus providing more room for an electrolyte. However, the separator layer 106 and fibrous mat 108 need not be laminated together, and may otherwise be simply disposed adjacent to one another.

The inventive separator preferably includes a porous membrane (such as a microporous membrane having pores less than about 1 micron, mesoporous, or a macroporous membrane having pores greater than about 1 micron) made of natural or synthetic materials, such as polyolefin, polyethylene, polypropylene, phenolic resin, natural or synthetic rubber, latex, synthetic wood pulp (SWP), glass fibers, synthetic fibers, cellulosic fibers, or combinations thereof, more preferably separator embodiments comprise a microporous membrane made from thermoplastic polymers. The preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, including ultrahigh molecular weight polyethylene (UHMWPE), and polypropylene. One preferred embodiment may include UHMWPE and a filler (e.g., silica). In general, the preferred membrane may be made by mixing, in an extruder, filler, thermoplastic polymer, such as UHMWPE, latex and/or rubber (if so desired), and processing plasticizer (e.g., processing oil).

The microporous membrane layer may include a polyolefin, such as polypropylene, ethylene-butene copolymer, and preferably polyethylene, more preferably high molecular weight polyethylene, (e.g., polyethylene having a molecular weight of at least 600,000), even more preferably ultra-high molecular weight polyethylene, (e.g., polyethylene having a molecular weight of at least 1,000,000, in particular more than 4,000,000, and most preferably 5,000,000 to 8,000,000 (measured by viscosimetry and calculated by Margolie's equation)), a standard load melt index of substantially zero (0) (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In certain selected embodiments, the membrane can be prepared by combining, by weight, about 5-15% polymer, in some instances, about 10% polymer, about 10-75% filler, in some instances, about 30% filler, and about 10-85% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) can be about (or can be between about these specific ranges) such as 2:1, 2.5:1, 3:1, 3.5:1, 4.0:1, 4.5:1, 5.0:1, 5.5:1 or 6:1. The filler:polymer ratio (by weight) can be from about 1.5:1 to about 6:1, in some instances, 2:1 to 6:1, from about 2:1 to 5:1, from about 2:1 to 4:1, and in some instances, from about 2:1 to about 3:1. The amounts of the filler, the oil, the polymer (such as polyethylene), and the rubber and/or latex (if so desired) are all balanced for runnability and desirable separator properties, such as electrical resistance (ER), porosity, physical strength, tortuosity, and so forth.

In accordance with at least one embodiment, the porous membrane can include an ultrahigh molecular weight polyethylene (UHMWPE) mixed with a processing oil and precipitated silica. In accordance with at least one embodiment, the microporous membrane can include an ultrahigh molecular weight polyethylene (UHMWPE) mixed with a processing oil, additive and precipitated silica. The mixture may also include minor amounts of other additives or agents as is common in the separator arts (such as wetting agents, colorants, antistatic additives, and/or the like). In certain instances, the microporous polymer layer can be a homogeneous mixture of 8 to 100 vol. % of polyolefin, 0 to 40 vol. % of a plasticizer and 0 to 92 vol. % of inert filler material. The filler may be dry, finely divided silica. The preferred plasticizer is petroleum oil. Since the plasticizer is the component which is easiest to remove from the polymer-filler-plasticizer composition, it is useful in imparting porosity to the battery separator.

In some embodiments, the porous membrane may be made by mixing, in an extruder, about 30% by weight silica with about 10% by weight UHMWPE, and about 60% processing oil. The microporous membrane can be made by passing the ingredients through a heated extruder, passing the extrudate generated by the extruder through a die and into a nip formed by two heated calender rolls to form a continuous web, extracting a substantial amount of the processing oil from the web by use of a solvent, drying the extracted web, slitting the web into lanes of predetermined width, and winding the lanes into rolls. The calender rolls may be engraved with various groove patterns to impart ribs, serrations, embossments and the like to the membrane. Alternatively, or additionally, ribs and the like may be imparted to the porous membrane by passing the extruded membrane through additional appropriately grooved calender or embossing rolls or presses.

Suitable fillers include silica, alumina, talc, and/or a combination thereof. Silica with relatively high levels of oil absorption and relatively high levels of affinity for mineral oil becomes desirably dispersible in the mixture of polyolefin (such as polyethylene) and mineral oil when forming a lead acid battery separator of the type shown herein. Additionally, the silica used herein may be precipitated silica and/or amorphous silica. In some selected embodiments, the filler has an average particle size no greater than 25 µm, in some instances, no greater than 22 µm, 20 µm, 18 µm, 15 µm, or 10 µm. In some instances, the average particle size of the filler particles (such as silica) is 15-25 µm. The particle size of the silica filler contributes to the oil absorption of the silica and/or the surface area of the silica filler. Silica particles in the final product or separator may fall within the sizes described above. However, the initial silica used as raw material may come as one or more agglomerates and/or aggregates and may have sizes around 200 µm or more. In some embodiments, the final separator sheet has a residual or final oil content in a range of about 0.5% to about 40%, in some embodiments, about 10 to about 30% residual processing oil, and in some instances, about 20 to about 30% residual processing oil or residual oil, per the weight of the separator sheet product. Regarding pore size of the separator membrane (containing polyolefin, such as polyethylene, and latex and/or rubber, if desired, in certain embodiments), the pore size may be submicron up to 100 µm, in certain embodiments, between about 0.1 and 10 µm. In certain embodiments, the separator membrane may have an average porosity of greater than approximately 10% and less than approximately 90%, and in other embodiments the porosity may be greater than approximately 40% and less than approximately 80%. In certain select embodiments, the separator membrane may have a porosity of greater than approximately 50%, in other embodiments the porosity may be greater than approximately 60%, greater than about 65% in certain embodiments, and greater than about 70% in certain other embodiments. One preferred embodiment provides a porous membrane with a porosity of greater than at least about 64%.

A microporous membrane made in accordance with the present invention, comprising polyethylene, filler (such as silica) and latex and/or rubber typically has a residual oil content; in some embodiments, such residual oil content is from about 0.5% up to about 40% of the total weight of the separator membrane (in some instances, about 10-30% of the total weight of the separator membrane, and in some instances, about 20-30% of that total weight). In certain selected embodiments herein, some to all of the residual oil content in the separator may be replaced by the addition of more of a performance enhancing additive, such as a surfactant, such as a surfactant with an HLB less than 6, or such as a nonionic surfactant. For example, a performance enhancing additive such as a surfactant, such as a nonionic surfactant, may comprise up to 0.5% all the way up to all of the amount of the residual oil content (e.g., all the way up to 20 or 30 or even 40%) of the total weight of the microporous separator membrane, thereby partially or completely replacing the residual oil in the separator membrane.

The separators disclosed herein contain latex and/or rubber, which can be a natural rubber, synthetic rubber, or a mixture thereof. Natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers (EPM and EPDM) and ethylene/vinyl acetate rubbers. The rubber can be a cross-linked rubber or an uncrosslinked rubber; in certain preferred embodiments, the rubber is uncrosslinked rubber. In certain embodiments, the rubber can be a blend of cross-linked and uncrosslinked rubber. The rubber can be present in the separator in an amount that is at least about 1%, 2%, 3%, 4%, 5%, 6%, 7%, 8%, 9%, or 10% by weight relative to the final separator weight (the weight of the polyolefin separator sheet or layer containing rubber and/or latex). In certain embodiments, the rubber can be present in an amount from about 1-20%, 2-20%, 2.5-15%, 2.5-12.5%, 2.5-10%, or 5-10% by weight.

For manufacturing the separators according to the invention, the rubber and/or latex may be incorporated into the extruder along with the polymer (e.g., polyethylene), the filler (e.g., silica), and the processing oil and/or plasticizer. In other embodiments, a microporous membrane, such as a polyethylene membrane, can be coated on one or both sides, preferably on the side facing the negative electrode, with a liquid slurry comprising the rubber and/or latex, optionally, silica, and water, and then dried and/or wherein a film of this material is formed upon the surface of the mentioned microporous membrane, such as a polyethylene membrane. For better wettability of this layer, known wetting agents can be added to the slurry for use in lead acid batteries. In certain embodiments, the slurry can also contain one or more performance enhancing additives (e.g., surfactants) described in detail below. After drying, a porous layer and/or film forms on the surface of the separator, which adheres very well to the microporous membrane and increases electrical resistance only insignificantly if at all. After the rubber is added to give a separator, it can be further compressed using either a machine press or calender stack or roll. The press or calender may be engraved to impart ribs, grooves, serrations, serrated ribs, embossments and the like into the separator.

A further embodiment of the present invention involves depositing rubber onto the membrane by impregnation and drying. For this purpose, glass mats, fleeces or fabrics made from synthetic fibers or mixtures with synthetic fibers, such as those described in the fibrous mat above can be used as carrier materials. By way of example, the fibrous mat may be the carrier of a performance enhancing additive, such as an antimony suppressing additive, and it may be impregnated into or included within the fibrous mat or coated on one or more surfaces of the fibrous mat. The slurry and/or coating and/or material included in the fibrous mat and/or on the fibrous mat, in such embodiments, may include the rubber and/or latex, optionally silica, water, and/or one or more performance enhancing additive, such as various additives described herein, wherein a film of the material, in surface embodiments, may form on one or more surfaces of the treated fibrous mat. Bonding can be carried out by compression or adhesion.

In various embodiments of the present invention, the porous and/or microporous membrane comprising polyolefin (such as polyethylene), latex and/or rubber, filler (such as silica), any residual oil and/or plasticizer, and performance enhancing additive in the form of a coating (such as a coating of surfactant) is laminated to another layer, such as the fibrous mat described above or a fibrous mat having enhanced wicking properties and/or enhanced wetting or holding of electrolyte properties. Such a fibrous mat may have a thickness that is at least 100 µm, in some embodiments, at least about 250 µm, at least about 400 µm, at least about 500 µm, at least about 600 µm, at least about 1.3 mm, at least about 2 mm, and so forth. The subsequent laminated separator may be cut into pieces. In certain embodiments, the fibrous mat is laminated to a ribbed surface of the microporous membrane separator layer. In certain embodiments, handling and/or assembly advantages are provided to the battery maker with the improved separator described herein, as it can be supplied in roll form and/or cut piece form. And as mentioned previously, the improved separator may be a standalone separator sheet or layer without the addition of one or more fibrous mats or retention mats or the like.

In some embodiments, the rubber and/or latex can be mixed with polymer, filler and processing oil (optionally with further additives) and extruded together to give a blended separator. In this way, a homogenous separator having rubber evenly dispersed throughout the membrane may be obtained. In some embodiments, the porous membrane can be impregnated with a rubber latex and subsequently dried.

The mixture may also include minor amounts of other additives or agents as is common in the separator arts (such as surfactants, wetting agents, colorants, antistatic additives, antioxidants, and/or the like). The mixture is extruded into the shape of a flat sheet, or a sheet having ribs or other protrusions on one or both sides of the sheet. After the membrane is extruded, it can be further compressed using either a machine press or calender stack or roll.

The press or calender may be engraved to impart ribs, and/or the like into the microporous membrane. The ribs may be a uniform set, an alternating set, or a mix or combination of solid, discrete broken ribs, continuous, discontinuous, angled, linear, longitudinal ribs extending substantially in a machine direction ("MD") (i.e., running from top to bottom of the separator in the battery) of the separator, lateral ribs extending substantially in a cross-machine direction CMD of the separator, transverse ribs extending substantially in a cross-machine direction ("CMD") (i.e., in a lateral direction of the separator in the battery, orthogonal to the MD) of the separator, cross ribs extending substantially in a cross-machine direction of the separator, discrete teeth or toothed ribs, serrations, serrated ribs, battlements or battlemented ribs, curved or sinusoidal, disposed in a solid or broken zig-zag-like fashion, grooves, channels, textured areas, embossments, dimples, porous, non-porous, mini ribs or cross-mini ribs, and/or the like, and combinations thereof. Further, either set of the ribs may extend from or into the positive side, the negative side, or both sides.

In some embodiments, the separator membrane can have a backweb of at least about 50 µm, at least about 75 µm, at least about 100 µm, at least about 125 µm, at least about 150 µm, at least about 175 µm, at least about 200 µm, at least about 225 µm, at least about 250 µm, at least about 275 µm, at least about 300 µm, at least about 325 µm at least about 350 µm, at least about 375 µm, at least about 400 µm, at least about 425 µm, at least about 450 µm, at least about 475 µm, or at least about 500 µm (though in certain embodiments, a very thin flat sheet less than 50 µm thick is provided, for example, between 10 µm and 50 µm thick). In certain embodiments, the porous membrane can have a backweb from about 50 µm-1,000 µm, about 50 µm-750 µm, about 100 µm-750 µm, about 200 µm-750 µm, about 200 µm-500 µm, about 150 µm-500 µm, about 250 µm-500 µm, about 250 µm-400 µm, or about 250 µm-350 µm.

In various possibly preferred embodiments, the porous membrane contains ribs, such as serrated, embattlemented, angled ribs, or broken ribs, or combinations thereof. The preferred ribs may be 8 µm to 1 mm tall and may be spaced 1 µm to 20 mm apart, while the preferred backweb thickness of the microporous polyolefin separator layer (not including the ribs or embossments) may be about 0.05 mm to about 0.50 mm (for instance, in certain embodiments, about 0.25 mm). For example, the ribs can be 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart. In some embodiments, the ribs may be in a pattern such as they may be on one side of the separator layer or on both sides of the polyolefin separator, from 0°-90° in relation to each other. In some embodiments, the acid mixing ribs may be front, positive or positive side ribs. Various patterns including ribs on both sides of the separator or separator layer may include positive ribs and negative longitudinal or cross-ribs on the second side or back of the separator, such as smaller, more closely spaced negative longitudinal or cross-ribs or mini-ribs. Such negative longitudinal or cross-ribs may, in some instances, be about 0.025 mm to about 0.1 mm in height, and preferably about 0.075 mm in height, but may be as large as 0.25 mm. Other patterns may include ribs on both sides of the separator layer with negative mini-ribs on the second side or back of the separator (mini-ribs that extend in the same direction, versus a cross-direction, compared with the major ribs on the other side of the separator). Such negative mini-ribs may, in some instances, be about 0.025 mm to about 0.25 mm in height, and preferably be about 0.050 mm to about 0.125 in height.

The ribs may be serrated in certain preferred embodiments. The serrations or serrated ribs may have an average tip length of from about 0.05 mm to about 1 mm. For example, the average tip length can be greater than or equal to 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to 1.0 mm, 0.9 mm, 0.8 mm, 0.7 mm, 0.6 mm, 0.5 mm, 0.4 mm, 0.3 mm, 0.2 mm, or 0.1 mm.

The serrations or serrated ribs may have an average base length of from about 0.05 mm to about 1 mm. For example, the average base length can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

If serrations or serrated ribs are present, they may have an average height of from about 0.05 mm to about 4 mm. For example, the average height can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm. For embodiments in which the serration height is the same as the rib height, the serrated ribs may also be referred to as protrusions. Such ranges may apply to separators for industrial traction-type start/stop batteries, where the total thickness of the separator may typically be about 1 mm to about 4 mm, as well as automotive start/stop batteries, where the total thickness of the separator may be a little less (e.g., typically about 0.3 mm to about 1 mm).

The serrations or serrated ribs can have an average center-to-center pitch of from about 0.1 mm to about 50 mm. For example, the average center-to-center pitch can be greater than or equal to about 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to about 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The serrations or serrated ribs can have an average height to base width ratio of from about 0.1:1 to about 500:1. For example, the average height to base width ratio can be greater than or equal to about 0.1:1, 25:1, 50:1, 100:1, 150:1, 200:1, 250:1, 300:1, 350:1, or 450:1; and/or less than or equal to about 500:1, 450:1, 400:1, 350:1, 300:1, 250:1, 200:1, 150:1, 100:1, 50:1, or 25:1.

The serrations or serrated ribs can have average base width to tip width ratio of from about 1000:1 to about 0.1:1. For example, the average base width to tip width ratio can be greater than or equal to about 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to about 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the separator can be dimpled. Dimples are typically protrusion-type features or nubs on one or more surfaces of the separator. The thickness of the dimples can be from 1-99% the thickness of the separator. For example, the average thickness of the dimples can be less than about 95%, 90%, 85%, 80%, 75%, 70%, 65%, 60%, 55%, 50%, 45%, 40%, 35%, 30%, 25%, 20%, 15%, 10%, or 5% that of the separator. Dimples may be arranged in rows along the separator. The rows or lines may be spaced about 1 μm to about 10 mm apart. For example, the rows can be about 0.05 mm, 0.1 mm, 0.2 mm, 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.25 mm, 2.5 mm, 2.75 mm, 3 mm, 4 mm, 5 mm, 6 mm, 7 mm, 8 mm, 9 mm, or 10 mm apart. Conversely, the dimples may be arranged in a random array or random manner.

The dimples may have an average dimple length of from about 0.05 mm to about 1 mm. For example, the average dimple length can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

The dimples may have an average dimple width of from about 0.01 mm to about 1.0 mm. For example, the average dimple width can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

The dimples can have an average center-to-center pitch of from about 0.10 mm to about 50 mm. For example, the average center-to-center pitch can be greater than or equal to about 0.2 mm, 0.3 mm, 0.4 mm, 0.5 mm, 0.6 mm, 0.7 mm, 0.8 mm, 0.9 mm, 1.0 mm, 1.25 mm, or 1.5 mm; and/or less than or equal to about 1.5 mm, 1.25 mm, 1.0 mm, 0.9 mm, 0.8 mm, 0.7 mm, 0.6 mm, 0.5 mm, 0.4 mm, 0.3 mm, or 0.2 mm.

The dimples can be quadrangular in shape, for instance, square and rectangles. The dimples can have an average dimple length to dimple width ratio of from about 0.1:1 to about 100:1. For example, the average length to base width ratio can be greater than or equal to about 0.1:1, 1:1, 2:1, 3:1, 4:1, 5:1, 6:1, 7:1, 8:1, 9:1, 10:1, 15:1, 20:1, 25:1, 50:1, 100:1, 150:1, 200:1, 250:1, 300:1, 350:1, 450:1, 500:1, 550:1, 600:1, 650:1, 700:1, 750:1, 800:1, 850:1, 900:1, 950:1, and/or less than or equal to about 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 50:1, 25:1, 20:1, 15:1, 10:1, 9:1, 8:1, 7:1, 6:1, 5:1, 4:1, 3:1, 2:1, or 1:1.

In some embodiments, the dimples can be substantially circular. Circular dimples can have a diameter from about 0.05 to about 1.0 mm. For example, the average dimple diameter can be greater than or equal to about 0.05 mm, 0.1 mm, 0.2 mm, 0.3 mm, 0.4 mm, 0.5 mm, 0.6 mm, 0.7 mm, 0.8 mm, or 0.9 mm; and/or less than or equal to about 1.0 mm, 0.9 mm, 0.8 mm, 0.7 mm, 0.6 mm, 0.5 mm, 0.4 mm, 0.3 mm, 0.2 mm, or 0.1 mm.

Various other shapes for the dimples may be included as well. By way of example only, such dimples might be triangular, pentagonal, hexagonal, heptagonal, octagonal, oval, elliptical, and combinations thereof.

In some embodiments, the separator can feature a combination of ribs, serrations or serrated ribs, dimples, or combinations thereof. For instance, a separator can have a series of serrated ribs running top to bottom along the separator, and a second series of serrated ribs running horizontally along the separator. In other embodiments, the separator can have an alternating sequence of serrated ribs, dimples, continuous, interrupted, or broken solid ribs, or combinations thereof.

Table 3 includes several specific embodiments of separators, presented by way of example only and not meant to be limiting, having serrations and/or dimples and various parameters that may be used in forming such separators so as to prevent acid stratification and enhance acid mixing with a flooded lead-acid battery (sometimes referred to as an enhanced flooded battery).

TABLE 3

| Separator Samples | Backweb thickness (mm) | Separator Thickness with rib (mm) | Spacing between ribs (mm) | Negative side ribs Profile (mm) | Serrated Rib and/or Dimple Features |
|---|---|---|---|---|---|
| Serrated separator profile | 0.25 | 0.85 | 7 | N/A | 0.75 tall; 2.5 mm spacing between serrations in a single row |
| Serrated separator profile 2 | 0.25 | 1.0 | 11 | 0.075 | 1 mm spacing between serrations in a single row. |
| Large Dimple separator profile | 0.25 | 1.0 | N/A | N/A | 12.3 mm spacing in one or more directions; 18 mm spacing in one or more directions. |

TABLE 3-continued

| Separator Samples | Backweb thickness (mm) | Separator Thickness with rib (mm) | Spacing between ribs (mm) | Negative side ribs Profile (mm) | Serrated Rib and/or Dimple Features |
|---|---|---|---|---|---|
| Small Dimple separator profile | 0.25 | 0.7 | N/A | N/A | 9 mm spacing in one or more directions; 5 mm spacing in one or more directions. |

Certain uses for various embodiments undergo start/stop cycles, such as those utilized in vehicles. This represents the fact that vehicles, and their associated batteries, will be in motion with intermittent periods of stopping, thus effectively shaking the battery. The separators disclosed herein preferably provide enhanced electrolyte mixing and/or acid circulation compared with conventional separators. In certain embodiments, the separators provide for less acid stratification, as measured by electrolyte density at the top and bottom of the cell. The density differential may be less than 50%, 45%, 40%, 35%, 30%, 25%, 20%, 15%, 10%, 5%, 2.5%, or 1%, after the cell has undergone 30, 60, 90 or more start/stop events or cycles. In certain selected embodiments, the density differential may be less than 50%, 45%, 40%, 35%, 30%, 25%, 20%, 15%, 10%, 5%, 2.5%, or 1%, after the cell has remained still for 24, 48, 72, or more hours.

Turning now to FIGS. 3A-3F, several exemplary embodiments depict broken rib arrangements with variables that define various broken rib patterns for various battery separator embodiments. FIGS. 4A-4G illustrate battery separators with broken ribs according to exemplary embodiments of the present disclosure and as defined in the patterns or arrangements of FIGS. 3A-3F. Exemplary battery separators are shown in FIGS. 4A-4G; additionally, exemplary battery separators disclosed herein may have any number of columns 406, such as columns $406^1$-$406^n$.

Figure 5A:
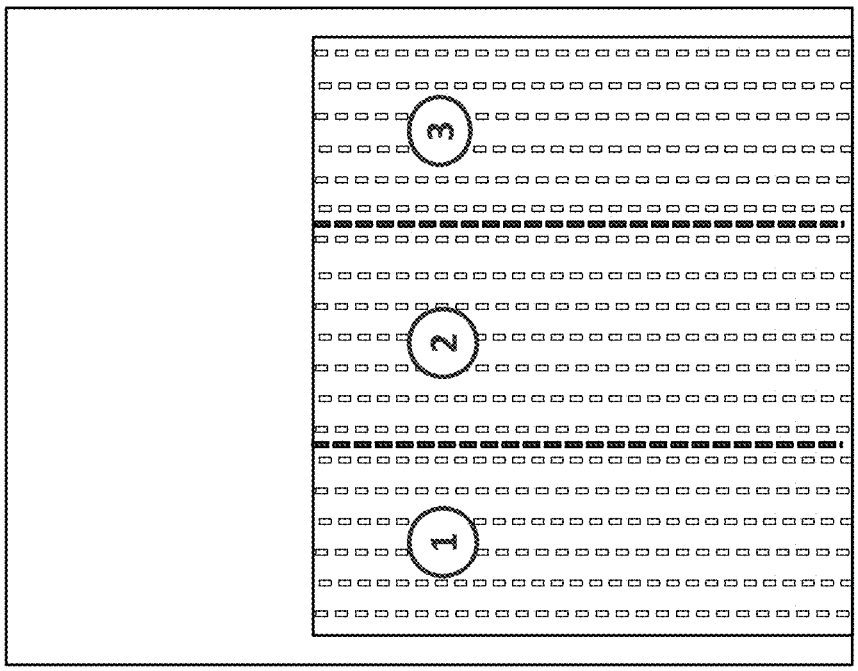
FIG. 5A details a separator having three zones of varying broken rib patterns.

FIG. 5A details a separator having three zones of varying broken rib patterns, with the zones changing in a lateral direction along the cross-machine direction of the separator. It is noted that the zones may also be spread in the machine direction of the separator, or in both the machine and cross-machine directions of the separator. It is further appreciated that there may be any number of zones in either or both directions. In addition, the edges of the separator themselves may be their own zone(s), such that the edges are optimized with a distinct design and/or ribbed pattern and/or broken rib pattern or the like for even better results. In certain preferred embodiments herein, the zones of the separator (for a multi-zoned separator) are formed such that the mass of the patterning in each zone is relatively consistent and/or such that the patterned separator runs well on battery formation equipment and/or such that batter formation is faster because of efficiency in acid filling.

Figure 5B:
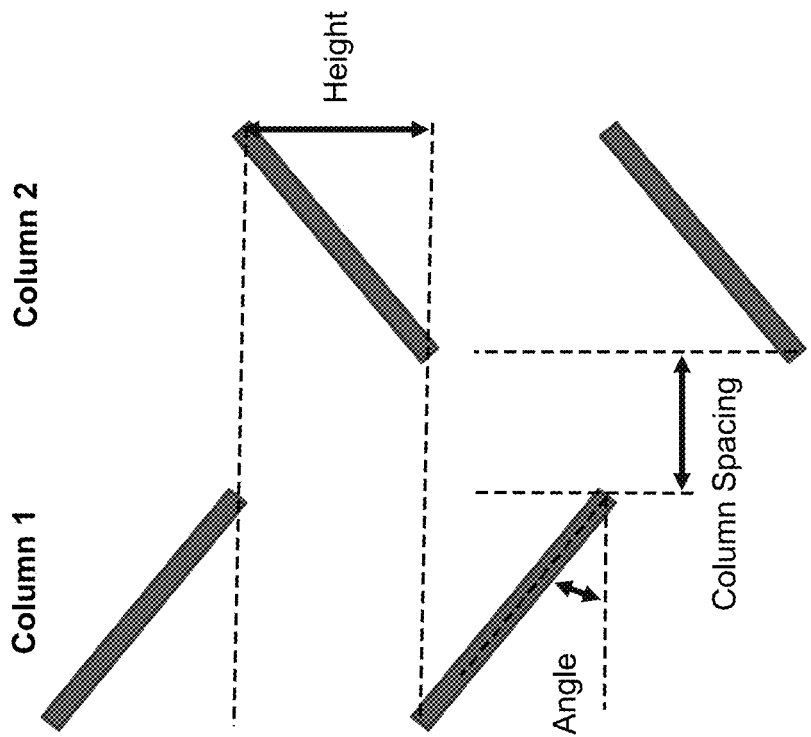
FIG. 5B depicts broken rib variables for a three-zoned broken rib separator.
Figure 5C:
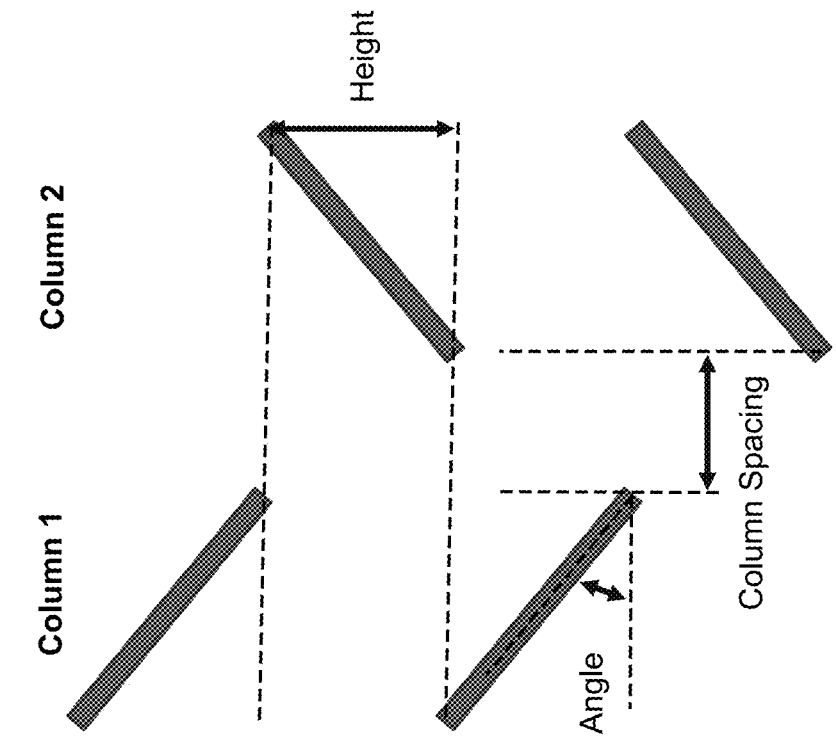
FIG. 5C depicts broken rib variables for a single-zoned broken rib separator.
Figure 6C:
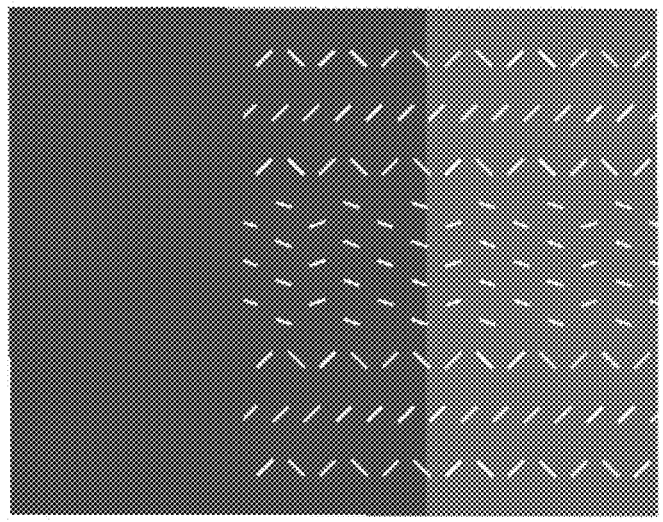
FIGS. 6A-6H depict variations of singled-zoned and multiple-zoned broken rib patterned separators.
Figure 6B:
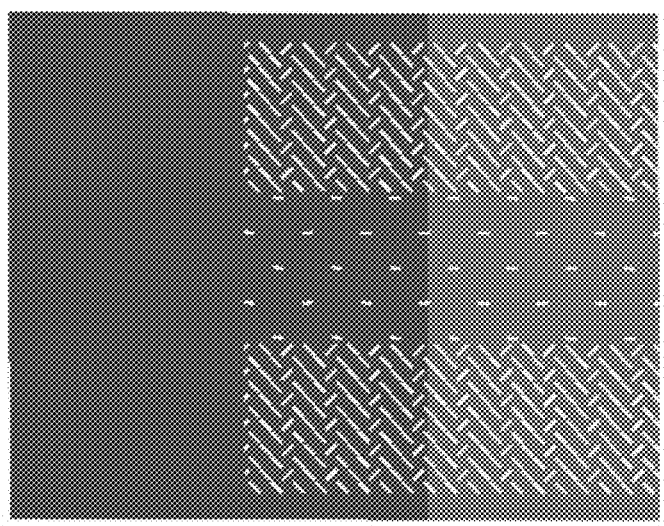
Figure 6A:
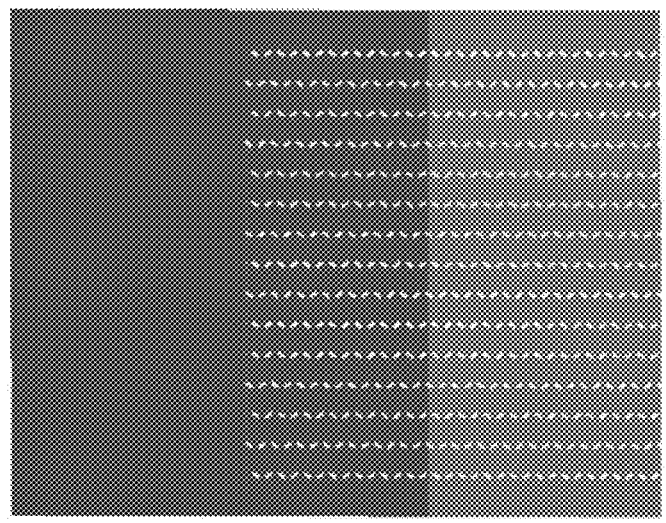
Figure 6D:
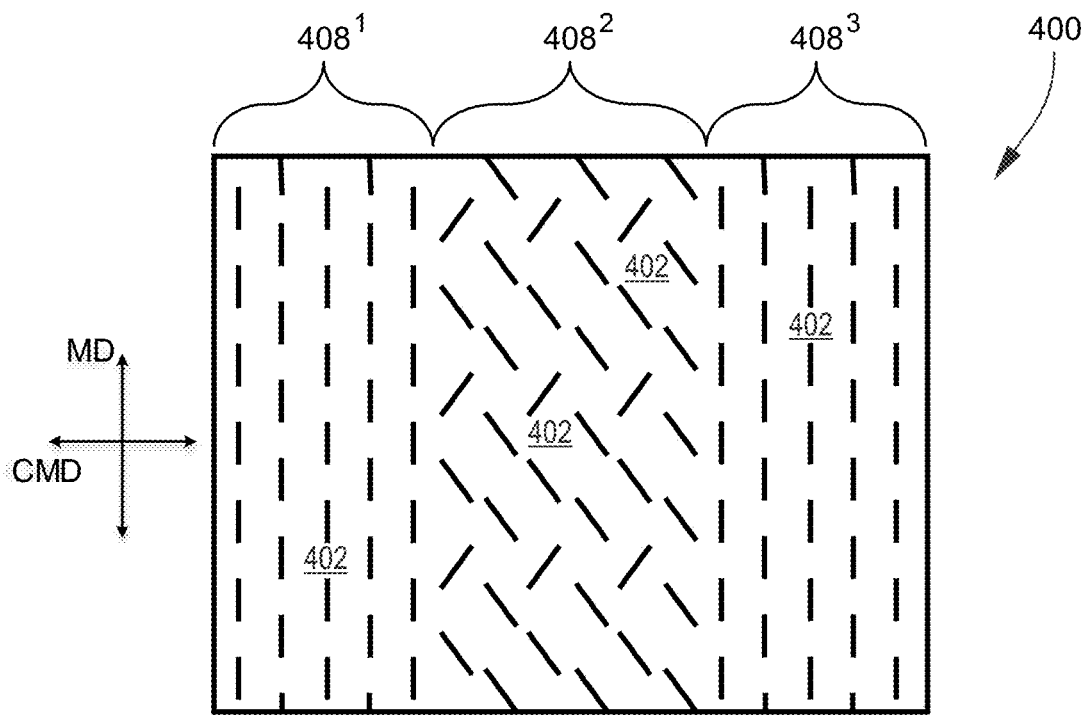
Figure 6E:
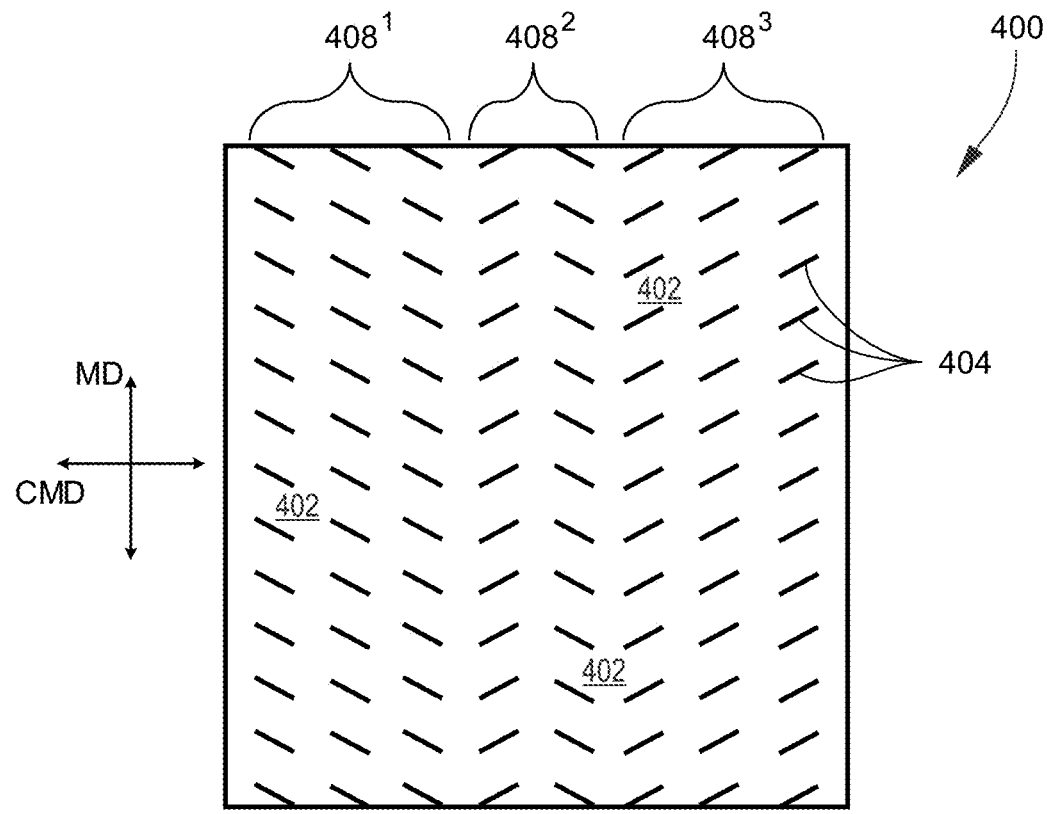
Figure 6F:
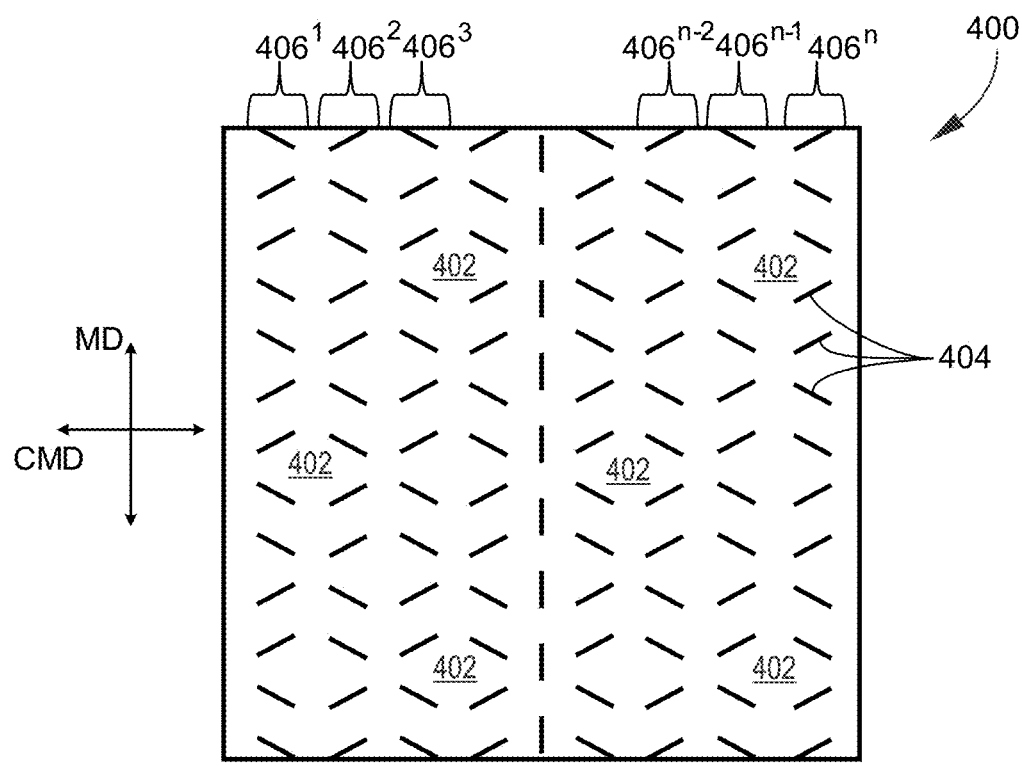
Figure 6G:
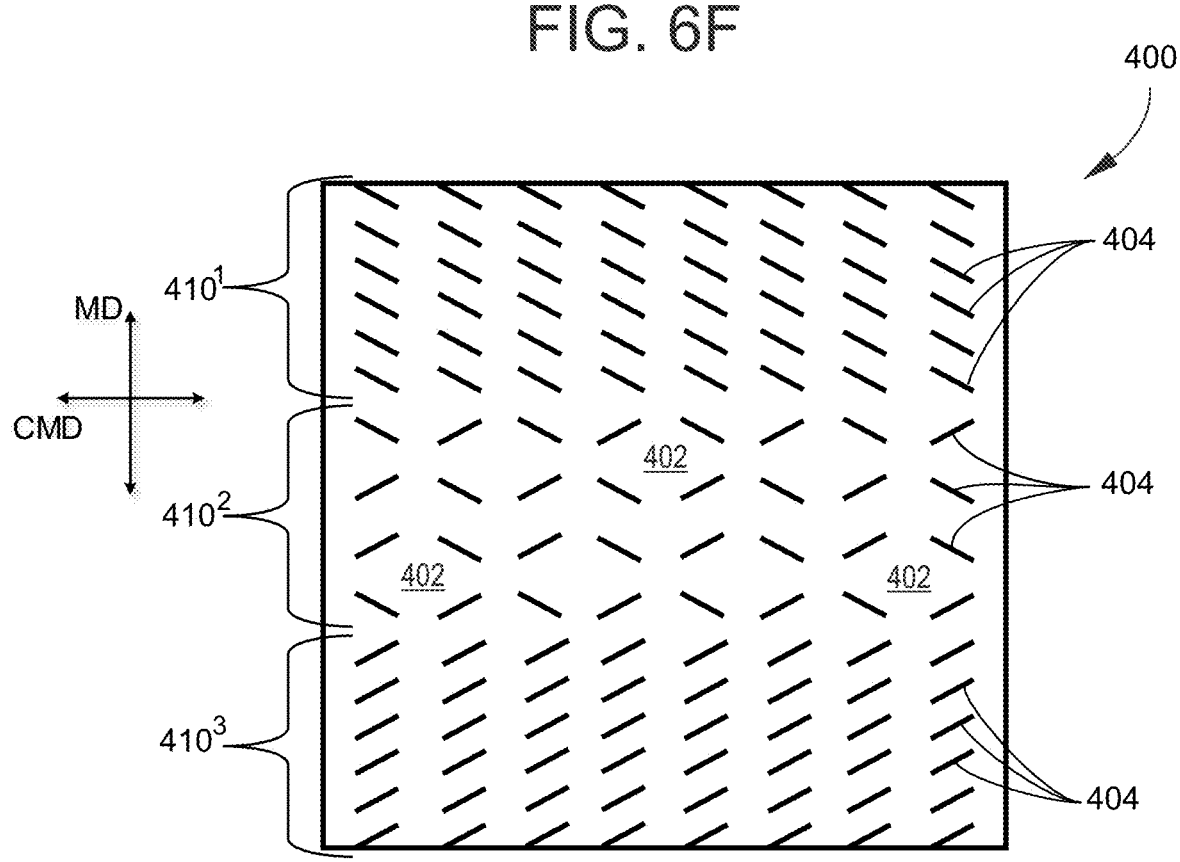
Figure 6H:
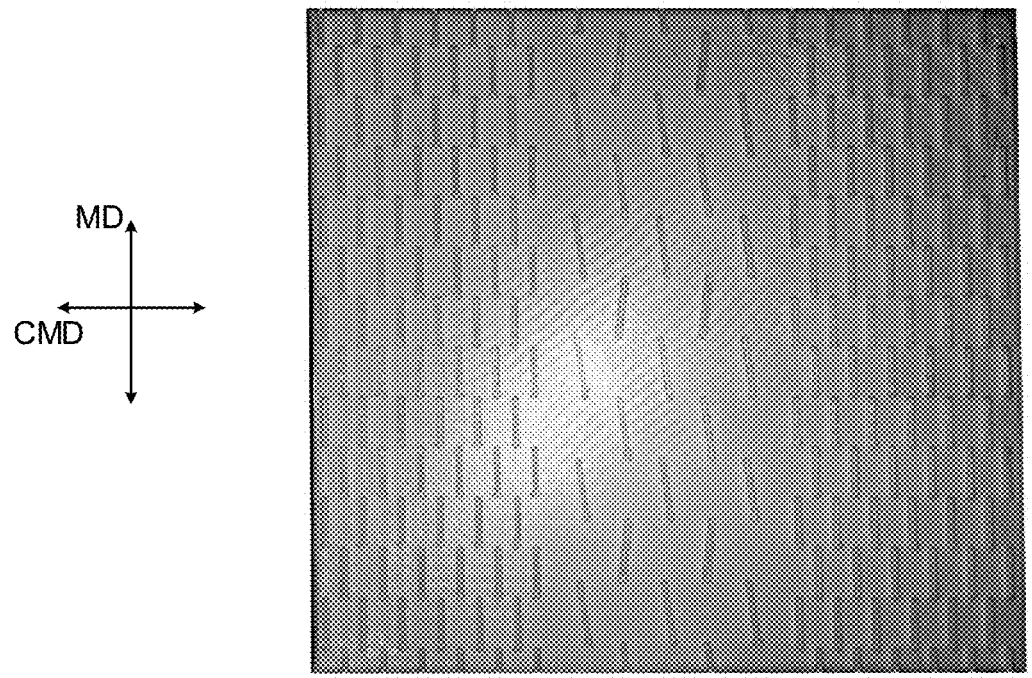

FIG. 5B depicts broken rib pattern variables for the zoned separator. The subscript numbers "1" and "2" relate to two different broken rib patterns. In certain embodiments, zone 1 and zone 3 (subscript "1") incorporate identical patterns, such as broken rib patterns, with zone 2 (subscript "2") having a pattern, such as a broken rib pattern, that varies from that in zones 1 and 3. FIG. 5C depicts broken rib variables for a single-zoned broken rib separator.

FIGS. 6A-6H depict variations of zoned or multi-zoned or three-zoned broken rib patterned separators.

Figure 7:
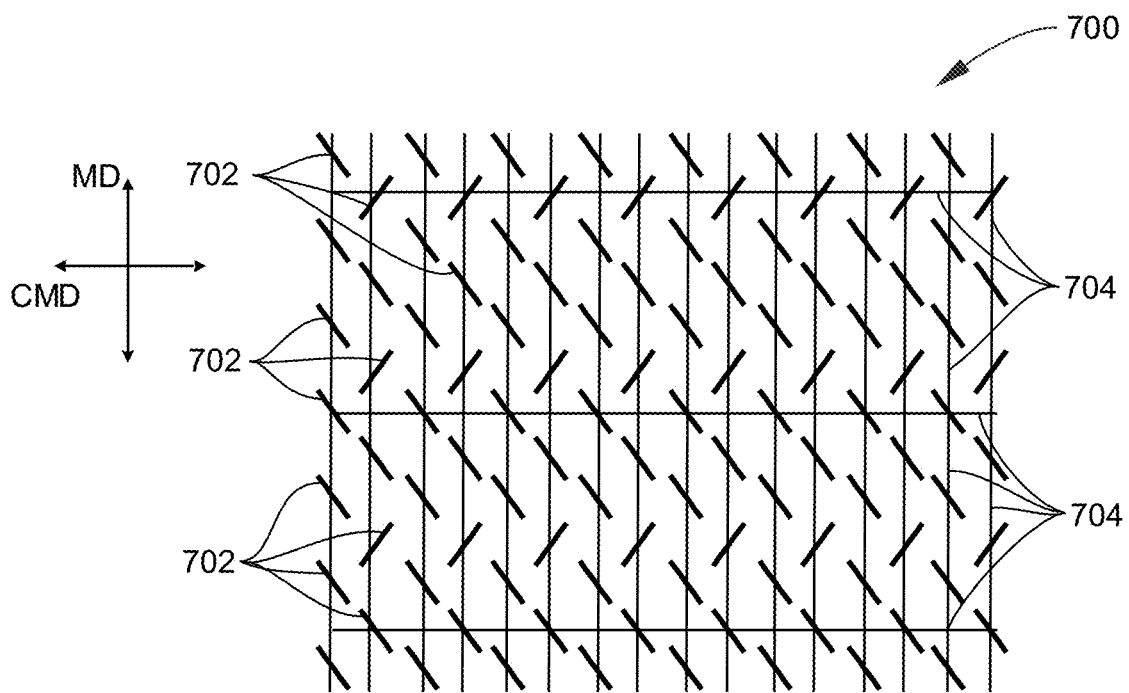
FIG. 7 depicts an exemplary inventive spacer having a pattern of broken ribs that may be placed, for example, between a flat separator and an electrode or a mat.

FIG. 7 depicts an exemplary inventive spacer 700 having a pattern of broken ribs 702 that may be placed between a separator and an electrode. As can be seen the broken ribs 702 are held in place by a network of thin stringers 704. The stringers 704 are shown in a vertical and horizontal arrangement, however it is appreciated that other angles may be incorporated.

Figure 8:
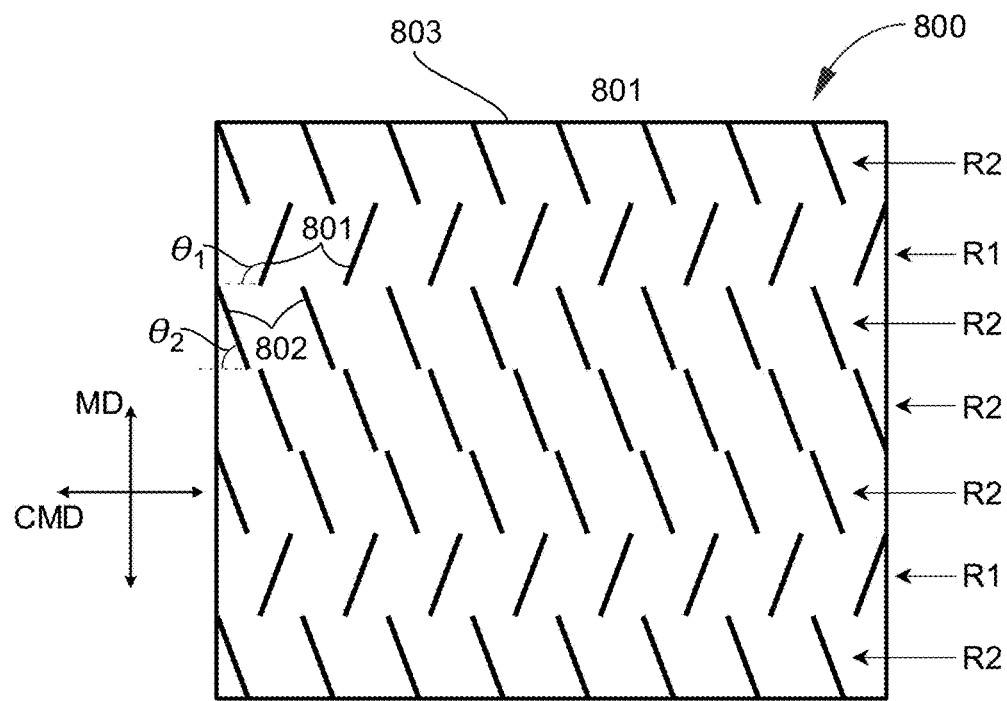
FIGS. 8 and 9 depict profile prototypes of exemplary inventive acid mixing profiles.
Figure 9:
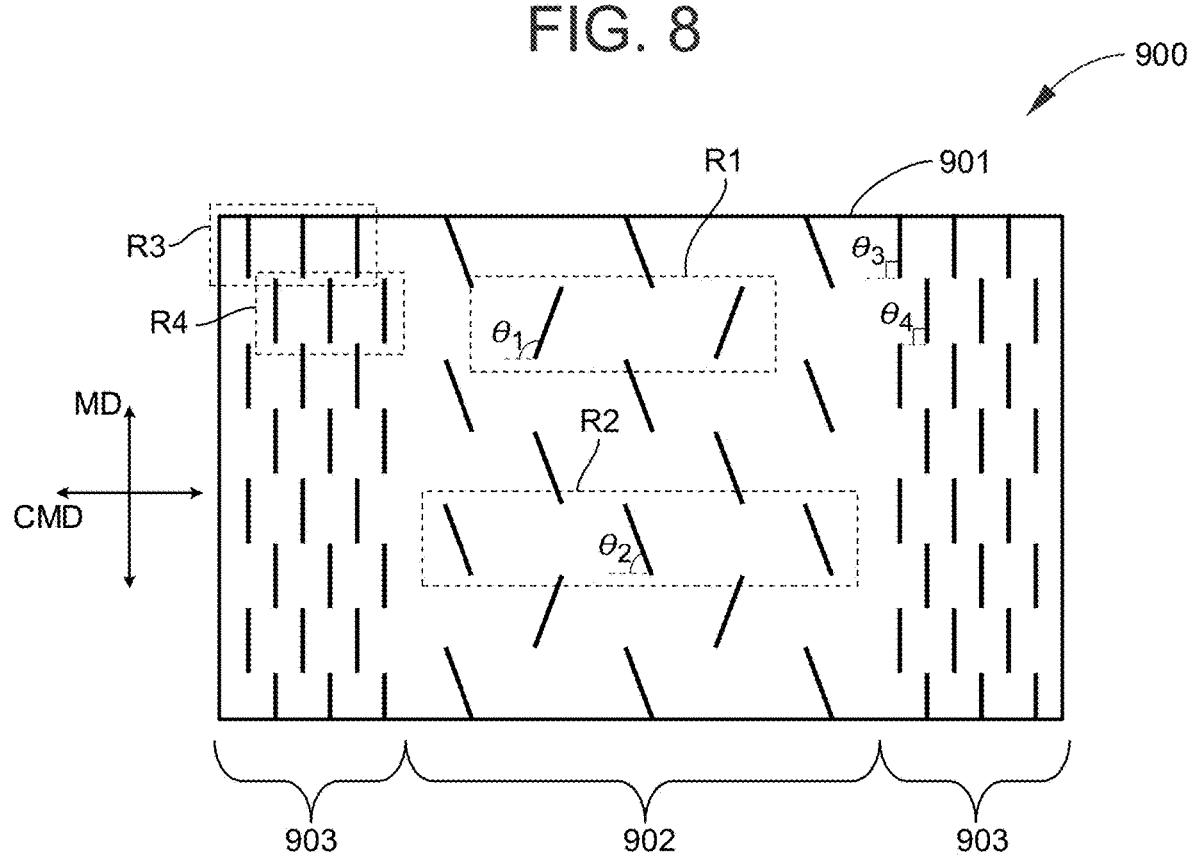

FIGS. 8 and 9 depict profile prototypes of exemplary inventive acid mixing profiles for various separator layers to be used herein.

The separator may include negative longitudinal or cross-ribs or mini-ribs, such as negative ribs having a height of about 25 to 250 microns, possibly preferably about 50 to 125 microns, and more preferably about 75 microns.

In certain embodiments, the protrusions can include ribs, wherein each rib has a longitudinal axis disposed at an angle from 0° to less than 180° relative to the top edge of the separator. In some instances, all the ribs in the separator can be disposed at the same angle, whereas in other embodiments, there can be ribs disposed at different angles. For instance, in some embodiments, the separator can include rows of ribs, wherein at least some of the rows have ribs at an angle θ relative to the top edge of the separator. All the ribs in a single row can have the same approximate angle, although in other cases a single row can contain ribs at differing angles.

In certain cases, an entire face of the separator will contains rows of protrusions or broken ribs, while in other embodiments, certain fragments of the separator face will not include protrusions or broken ribs. These fragments may occur along any edge of the separator, including top, bottom or sides, or may occur towards the middle of the separator, wherein the fragment is surround on one or more sides with portions having protrusions.

FIG. 8 includes a depiction of a separator 800 including a top edge 803, and a first set of rows R1 and second sets of rows R2. In certain embodiments, ribs 801 in the first row R1 are disposed at an angle $\theta_1$ from 0° to less than 180°, and ribs 802 in the second rows R2 are disposed an angle $\theta_2$ from 0° to less than 180°, which may be the same or different than the angle for the ribs 801 in the first set of rows R1. Though not shown, the angles $\theta_1$, $\theta_2$ may further vary throughout their respective rows R1, R2 at each individual rib 801, 802. In addition, the sets of broken ribs can just as easily be patterned by column.

FIG. 9 includes a depiction of a separator 900 including a top edge 901 having a central first portion 902 and outer second portions 903. In certain embodiments, the central first portion 902 may contain one or more sets of rows. As shown in FIG. 9, the first row R1, and the second row R2 are similarly patterned as that shown in FIG. 8, with ribs in the first row R1 disposed at an angle from 0° to less than 180°, and ribs in the second row R2 disposed an angle from 0° to less than 180°, which may be the same or different than the angle for the ribs in the first row R1.

Remaining with FIG. 9, the outer second portions 903 may include a third set of rows R3 having ribs at an angle $\theta_3$ relative to the top edge of the backweb, wherein $\theta_3$ is from 0° to 90°, from 30° to 85°, from 45° to 85°, from 60° to 85°, from 60° to 80°, or from 60° to 75°. One preferred value for $\theta_3$ is 90°. The outer second portions 903 may also include a fourth set of rows R4 having ribs at an angle $\theta_4$ relative to the top edge of the backweb, wherein ea is from 90° to less than 180°, from 95° to 150°, from 95° to 120°, from 100° to 120°, or from 105° to 120°. One preferred value for ea is 90°. The ribs in different rows can have the same or different dimensions as the other rows and ribs may have the same or different dimensions within the row. The distance between adjacent rows can be from −5 mm to +5 mm, wherein negative numbers indicate the degree of overlap of the rows. The distance can be measured center-rib to center-rib.

When different rows are present, the rows may occur in a repeating pattern. The simplest repeating pattern —R3-R4-, may be seen in separator 900. Other patterns include —R3-R3-R4-; —R3-R3-R3-R4-; —R3-R3-R4-R4-; —R3-R3-R3-R3-R4-; —R4-R3-R3-R3-R4-, —R3-R3-R3-R4-R4-; and the like. In addition, the sets of broken ribs can just as easily be patterned by column.

In some selected embodiments, the porous separator can have negative longitudinal or cross-ribs on the opposite face of the membrane as the protrusions. The negative or back rib can be parallel to the top edge of the separator, or can be disposed at an angle thereto. For instance, the cross ribs can be oriented about 90°, 80°, 75°, 60°, 50°, 45°, 35°, 25°, 15° or 5° relative to the top edge. The cross-ribs can be oriented about 90-60°, 60-30°, 60-45°, 45-30°, or 30-0° relative to the top edge. Typically the cross ribs are on the face of the membrane facing the negative electrode. In some embodiments of the present invention, the ribbed membrane can have a transverse cross-rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib height of no greater than about 1.0 mm, 0.5 mm, 0.25 mm, 0.20 mm, 0.15 mm, 0.10 mm or 0.05 mm.

In some embodiments of the present invention, the ribbed membrane can have a transverse cross-rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib width of no greater than about 1.0 mm, 0.5 mm, 0.25 mm, 0.20 mm, 0.15 mm, 0.10 mm or 0.05 mm.

In certain selected embodiments the porous membrane can have a transverse cross-rib height of about 0.10-0.15 mm, and a longitudinal rib height of about 0.10-0.15 mm. In some embodiments, the porous membrane can have a transverse cross-rib height of about 0.10-0.125 mm, and a longitudinal rib height of about 0.10-0.125 mm.

The microporous membrane can have a backweb thickness that is at least 0.1 mm, 0.2 mm, 0.3 mm, 0.4 mm, 0.5 mm 0.6 mm, 0.7 mm, 0.8 mm, 0.9 mm or 1.0 mm. The ribbed separator can have a backweb thickness that is no more than about 1.0 mm, 0.9 mm, 0.8 mm, 0.7 mm, 0.6 mm, 0.5 mm, 0.4 mm, 0.3 mm, 0.2 mm or 0.1 mm. In some embodiments, the microporous membrane can have a backweb thickness between about 0.1-1.0 mm, 0.1-0.8 mm, 0.1-0.5 mm, 0.1-0.5 mm, 0.1-0.4 mm, 0.1-0.3 mm. In some embodiments, the microporous membrane can have a backweb thickness of about 0.2 mm.

Figure 10:
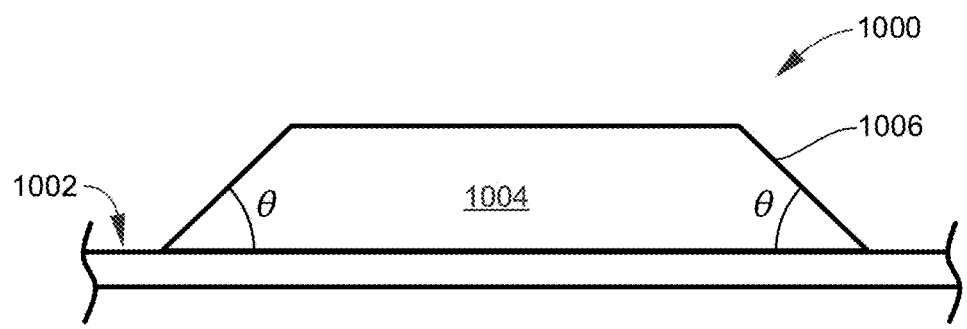
FIG. 10 depicts an exemplary embodiment of a rib having one, or both, tapered longitudinal ends, or a rib, a serrated or broken rib, or an angled serrated or broken rib, with a particular end face angle (or angle in a particular range of angles).
Figure 11:
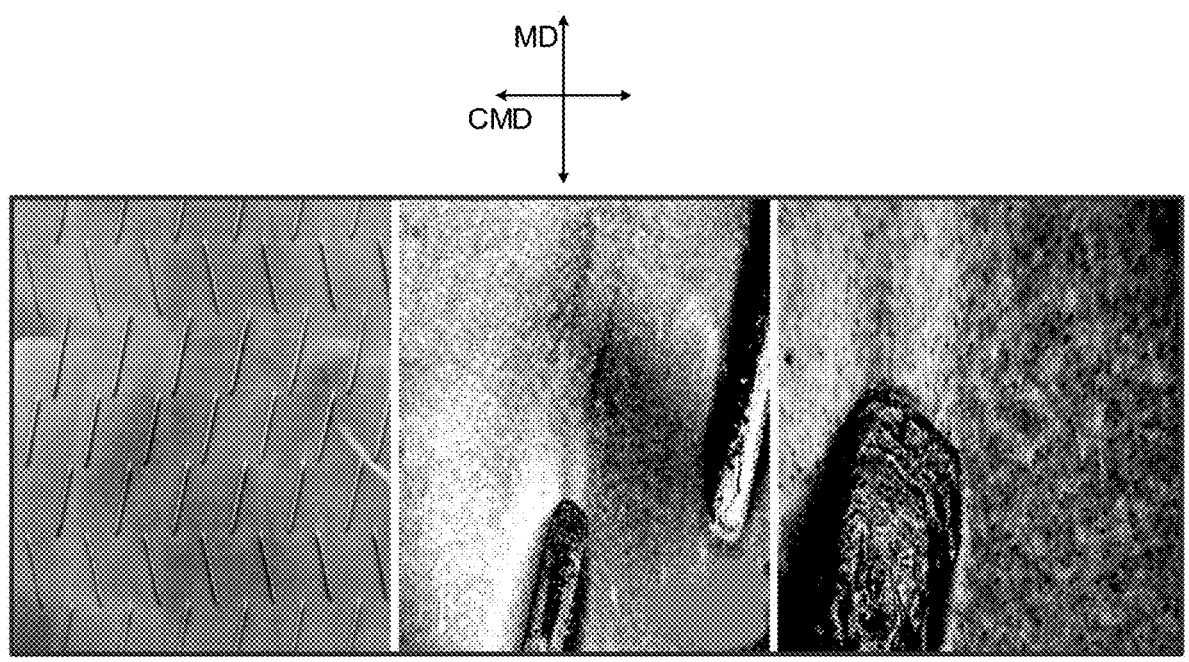
FIG. 11 depicts an exemplary embodiment of a separator layer having one or more ribs having one or more tapered longitudinal ends at a particular angle (or at an angle within a particularly preferred range). The patterned separator layer depicted in FIGS. 10-12, for example, provides a significant amount of acid mixing (e.g., acid turbulence, reduced acid stratification, etc.) to a flooded lead acid battery, such as an enhanced flooded lead acid battery. In addition, the angled design(s) of the separator layers depicted in FIGS. 10-12, for example, allow for optimal surface area of the separator layer, optimal mixing, as well as optimal manufacturability and/or machinability and/or envelopeability (particularly in view of improved stiffness ratio between stiffness in the MD (machine direction) and stiffness in the cross machine direction (CMD). In addition, the patterned separator layer depicted in FIGS. 10-12 may be a robust separator layer that is more or even significantly more robust than conventional microporous separator layers.
Figure 12A:
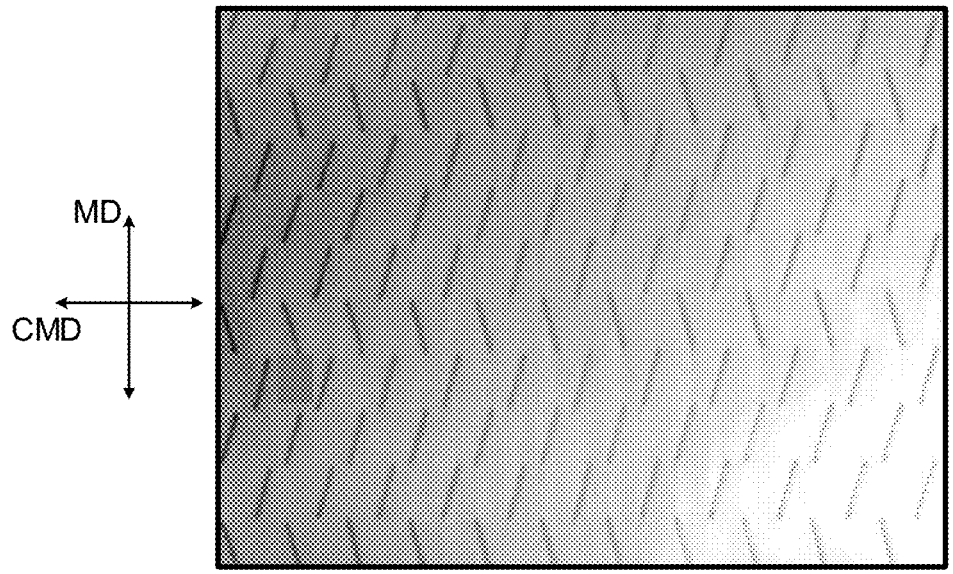
FIGS. 12A and 12B depict two exemplary embodiments of separator layers.
Figure 12B:
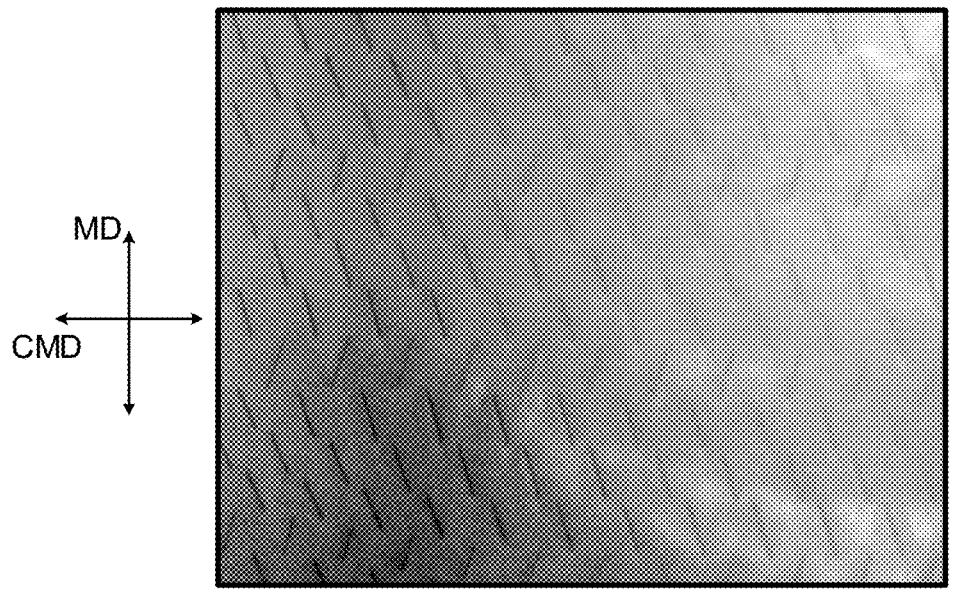

FIG. 10 depicts a side profile of a separator 1000 having a broken rib 1004 extending out from a surface of a porous membrane 1002 that has a tapered longitudinal end 1006 identified by angle θ.

Figure 13A:
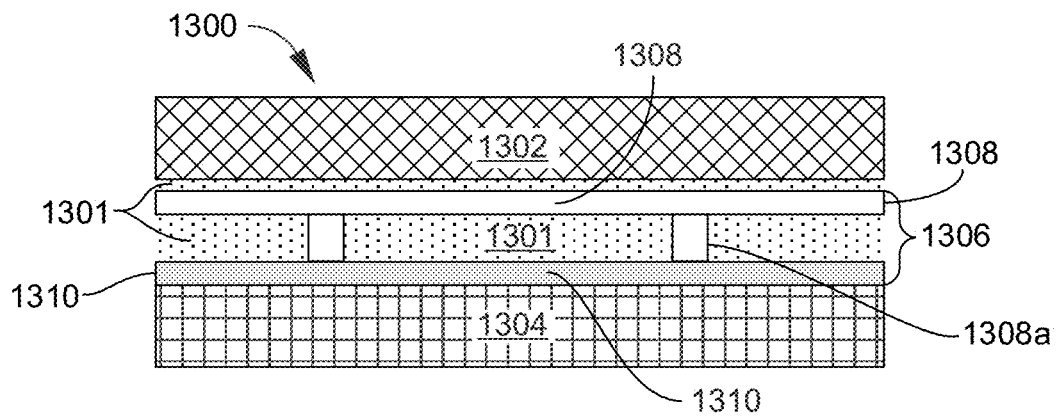
FIG. 13A is a top-down view of an exemplary battery separator situated between a positive and negative electrode as may be found in a typical lead acid battery.

With reference now to FIG. 13A, an exemplary battery cell 1300 is depicted looking down from the top of an exemplary battery (the entire battery is not shown). The battery cell is provided with an acidic electrolyte 1301, such as a sulfuric acid ($H_2SO_4$) electrolyte, submerging a negative electrode 1302, a positive electrode 1304, and a separator assembly 1308 that is disposed between the electrodes 1302, 1304. The separator assembly 1306 may be provided with a porous membrane 1308 and a fibrous mat 1310. The porous membrane may 1308 may be provided with a series of positive ribs 1308a extending therefrom in contact with the fibrous mat 1310. The fibrous mat 1310 may be provided in intimate contact with the positive electrode 1304. Though not shown, the porous membrane 1308 may further be provided with negative ribs, as described herein, and in contact with the negative electrode 1302. The negative electrode 1302 may be provided with a negative active material ("NAM"), and the positive electrode 1304 may be provided with a positive active material ("PAM").

Figure 13B:
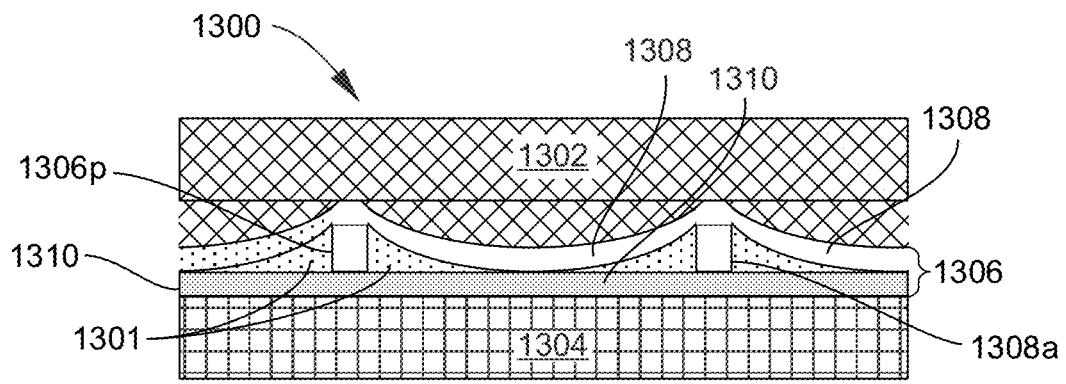
FIG. 13B is a top-down view of an exemplary battery separator and swollen negative active material as may be found in a typical lead acid battery.

It is believed that in certain batteries, the NAM may swell to the point of exerting enough pressure on the porous membrane 1308 so as to deflect it between the positive ribs 1308a. FIG. 13B schematically illustrates this swelling and deflection cause and effect such that the porous membrane 1308 contacts the fibrous mat 1310. When the porous membrane 1308 deflects enough, both of the negative electrode 1302 and the positive electrode 1304 are starved of electrolyte (i.e., acid starvation). This acid starvation negatively affects the performance of the battery and may be seen in deep-cycling batteries and those operating in a PSoC. Though not shown, the porous membrane 1308 may further be provided with negative ribs, as described herein, and in contact with the negative electrode 1302.

Figure 13C:
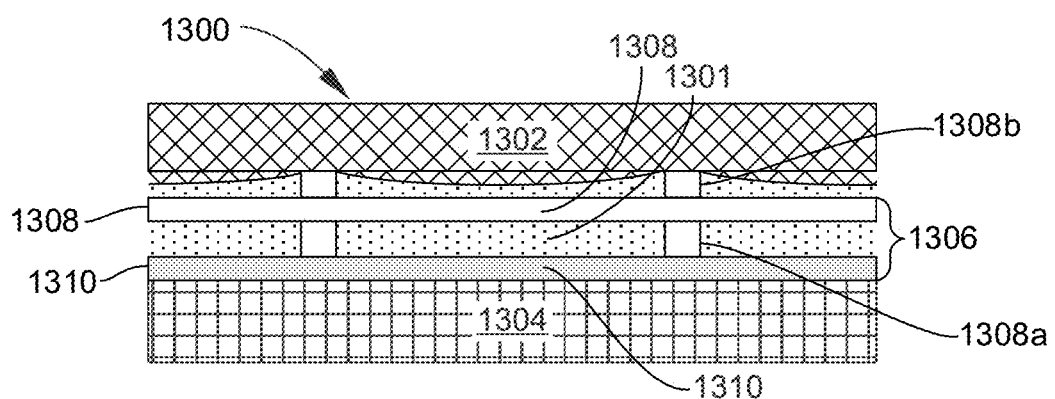
FIG. 13C is a top-down view of an exemplary embodiment of a new or improved battery separator of the present invention disposed between a positive electrode and negative electrode (such as electrodes as may be found in a typical lead acid battery, flooded battery, or enhanced flooded battery); the negative electrode is shown with swollen NAM (that preferably does not contact or deflect the backweb as shown in FIG. 13B).

Referring now to FIG. 13C, a schematic illustration of an exemplary separator assembly 1306 of the present invention is shown. In this embodiment, an array of positive ribs 1308a are provided extending from the porous membrane 1308 in the machine direction and in contact with the fibrous mat 1310. In addition, an array of negative ribs 1308b are provided extending from the porous membrane 1308 in the machine direction and in contact with the negative electrode 1302. This provides spacing between the NAM and the backweb, such that the NAM swelling does not affect the porous membrane 1308. Furthermore, both of the positive ribs 1308a and the negative ribs 1308b may be spaced closer together than that of FIG. 13B to provide more support to the NAM.

It should be noted that FIGS. 13A to 13C are not drawn to scale.

Figure 14:
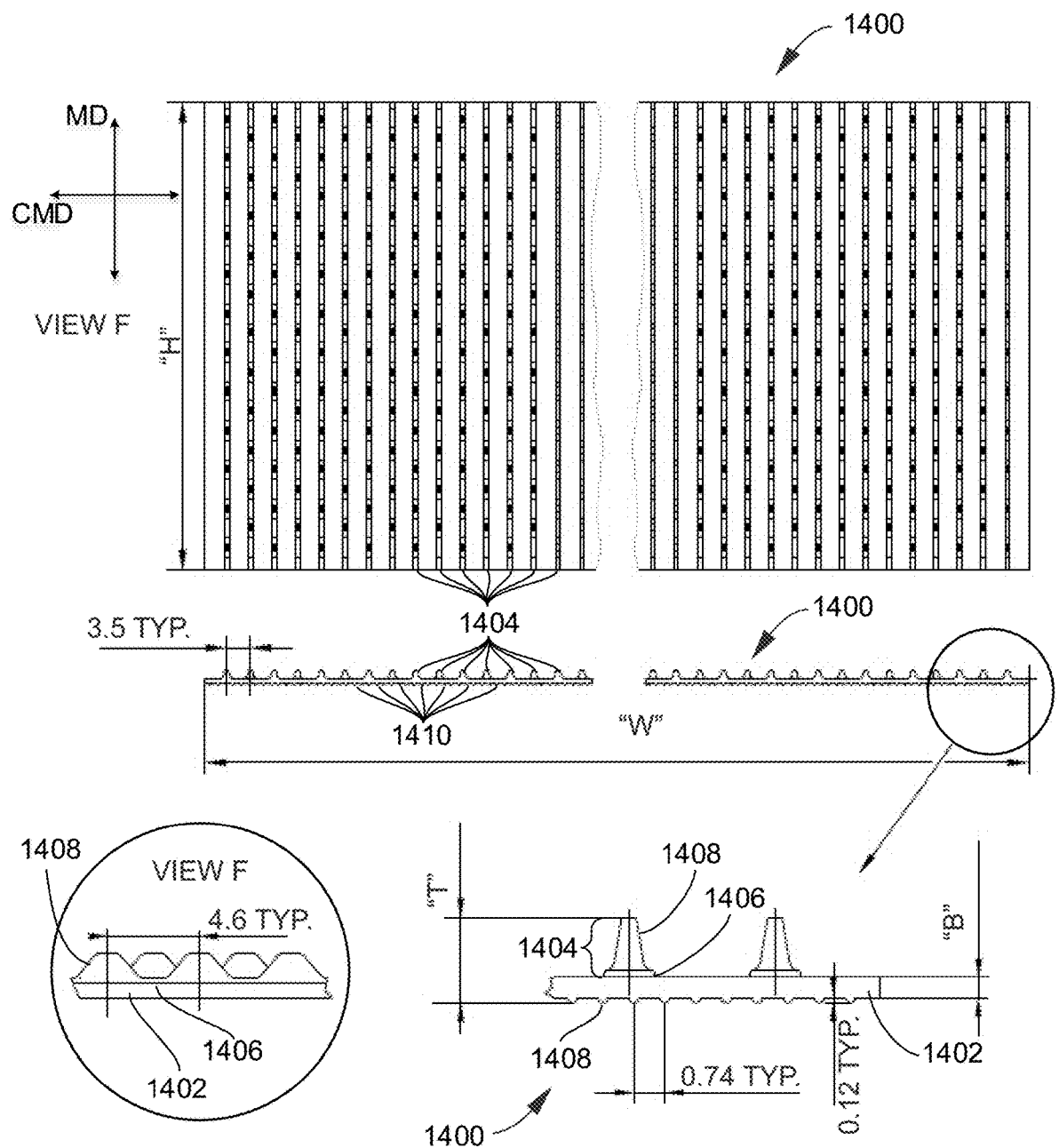
FIG. 14 illustrates an exemplary embodiment of a rib profile for an exemplary embodiment of a separator of the present invention.

Referring now to FIG. 14, an exemplary porous membrane separator 1400 is provided with a backweb 1402 with positive ribs 1404 extending therefrom and substantially aligned in a machine direction ("MD") of the separator that are intended to contact a fibrous mat (not shown in FIG. 14) in an exemplary battery. The separator is further provided with negative ribs 1410 substantially aligned in a machine direction of the separator and substantially parallel to the positive ribs 1404. The negative ribs 1410 are intended to contact a negative electrode in an exemplary battery. While the negative ribs 1410 in this illustrated example are substantially aligned in a machine direction of the separator, they may alternatively be substantially aligned in the cross-machine direction, typically known as negative cross-ribs.

With continued reference to FIG. 14, select embodiments of the inventive separator are provided with an array of positive ribs 1404. The positive ribs 1404 are provided with a base portion 1406 that may extend the length of the separator in the machine direction. Spaced teeth, discontinuous peaks, or other protrusions 1408 may then extend from the surface of the base portion 1406, such that the teeth 1408 are raised above the underlying surface of the porous membrane backweb 1402. Furthermore, the base portion 1406 may be wider than the teeth 1408 themselves. The positive ribs 1404 run substantially parallel to one another at a typical spacing of approximately 2.5 mm to approximately 6.0 mm, with a typical spacing of approximately 3.5 mm.

The height of the positive ribs 1404 (combined base portion 1406 and teeth 1408) as measured from the surface of the porous membrane backweb 1402 may be approximately 10 µm to approximately 4.0 mm, with a typical height of approximately 0.5 mm. Exemplary rib teeth 1408 of adjacent ribs 1404 may be substantially in line with one another. However as pictured in FIG. 14, exemplary teeth 1408 may be offset from one another from one rib 1404 to an adjacent rib 1404, either entirely or partially out of phase from an adjacent rib. As shown, the teeth 1408 are entirely out of phase from one rib 1404 to an adjacent rib. The positive rib teeth 1408 may be spaced at a pitch in the machine direction of the separator of approximately 3.0 mm to approximately 6.0 mm, with a typical spacing of approximately 4.5 mm.

As shown in FIG. 14, negative ribs are depicted as being substantially parallel to the machine direction of the separator. However, they may alternatively be substantially parallel to a cross machine direction. The depicted exemplary negative ribs are shown as being solid and substantially straight. However, they may alternatively be toothed in a generally similar manner as the positive ribs shown in FIG. 14. The negative ribs may be spaced at a pitch of approximately 10 µm to approximately 10.0 mm, with a preferred pitch between approximately 700 µm and approximately 800 µm, with a more preferred nominal pitch of approximately 740 µm. The height of the negative ribs as measured from the surface of the backweb may be approximately 10 µm to approximately 2.0 mm.

It should be noted that the positive ribs may alternatively be placed in an exemplary battery such that they contact the negative electrode. Likewise, the negative ribs may alternatively be placed in an exemplary battery such that they contact the positive electrode.

Table 4, below, details the rib count and the percentage of surface contact area for four separators (one exemplary inventive separator and three control separators) that are 162 mm by 162 mm (262 cm$^2$). As shown, the exemplary inventive separator has 43 toothed ribs uniformly spaced across the width of the separator in the cross-machine direction. The teeth of the positive ribs on the exemplary inventive separator contacts 3.8% of the 262 cm$^2$ on the positive electrode. The details of the control separators are further detailed in Table 4. It is appreciated that control separators #1, #2, and #3 are typical of commercially available separators presently used flooded lead acid batteries generally and presently available on the market.

TABLE 4

| Separator | Ribs (No. (configuration)) | Contact area (% of total area) |
|---|---|---|
| Inventive Separator | 43 (toothed ribs) | 3.8% |
| Control #1 | 22 (solid ribs) | 4.8% |
| Control #2 | 18 (solid ribs) | 3.9% |
| Control #3 | 11 (solid ribs) | 2.9% |

As stated, the inventors found that maximizing the number of contact points while simultaneously minimizing the contact area achieves the goal of increasing separator resiliency while keeping electrical resistance under control. Furthermore, the toothed design helps facilitate acid mixing by utilizing any motion to which a battery may be subjected. The teeth of the separator ribs may be approximately 2.5 mm to approximately 6.0 mm apart from the closest adjacent tooth. The inventors have found that a preferred, non-limiting, distance is approximately 4.2 mm between adjacent teeth. In addition, the teeth being offset from adjacent rows being completely out of phase helps to facilitate acid mixing. The inventors have also found that the base portion helps to stiffen the backweb enough to provide resilience to the NAM swelling.

It is appreciated that while the exemplary inventive ribs are shown and described as being positive ribs, they may nonetheless be provided on the negative side of the separator, and the illustrated and described negative ribs may be provided on the positive side of the separator.

The positive or negative ribs may additionally be any form or combination of solid ribs, discrete broken ribs, continuous ribs, discontinuous ribs, angled ribs, linear ribs, longitudinal ribs extending substantially in a machine direction of said porous membrane, lateral ribs extending substantially in a cross-machine direction of said porous membrane, transverse ribs extending substantially in said cross-machine direction of the separator, discrete teeth, toothed ribs, serrations, serrated ribs, battlements, battlemented ribs, curved ribs, sinusoidal ribs, disposed in a continuous zig-zag-sawtooth-like fashion, disposed in a broken discontinuous zig-zag-sawtooth-like fashion, grooves, channels, textured areas, embossments, dimples, columns, mini columns, porous, non-porous, mini ribs, cross-mini ribs, and combinations thereof.

The positive or negative ribs may additionally be any form or combination of being defined by an angle that is neither parallel nor orthogonal relative to an edge of the separator. Furthermore, that angle may vary throughout the teeth or rows of the ribs. The angled rib pattern may be a possibly preferred Daramic® RipTide™ acid mixing rib profile that can help reduce or eliminate acid stratification in certain batteries. Moreover, the angle may be defined as being relative to a machine direction of the porous membrane and the angle may between approximately greater than zero degrees (0°) and approximately less than 180 degrees (180°), and approximately greater than 180 degrees (180°) and approximately less than 360 degrees (360°).

The ribs may extend uniformly across the width of the separator, from lateral edge to lateral edge. This is known as a universal profile. Alternatively, the separator may have side panels adjacent to the lateral edges with minor ribs disposed in the side panel. These minor ribs may be more closely spaced and smaller than the primary ribs. For instance, the minor ribs may be 25% to 50% of the height of the primary ribs. The side panels may alternatively be flat. The side panels may assist in sealing an edge of the separator to another edge of the separator as done when enveloping the separator, which is discussed hereinbelow.

In select exemplary embodiments, at least a portion of the negative ribs may preferably have a height of approximately 5% to approximately 100% of the height of the positive ribs. In some exemplary embodiments, the negative rib height may be approximately 5%, 10%, 15%, 20%, 25%, 30%, 35%, 40%, 45%, 50%, 55%, 60%, 65%, 70%, 75%, 80%, 95%, or 100% compared to the positive rib height. In other exemplary embodiments, the negative rib height may no greater than approximately 100%, 95%, 90%, 85%, 80%, 75%, 70%, 65%, 60%, 55%, 50%, 45%, 40%, 35%, 30%, 25%, 20%, 15%, 10%, or 5% compared to the positive rib height.

In some select embodiments, at least a portion of the porous membrane may have negative ribs that are longitudinal or transverse or cross-ribs. The negative ribs may be parallel to the top edge of the separator, or may be disposed at an angle thereto. For instance, the negative ribs may be oriented approximately 0°, 5°, 15°, 25°, 30°, 45°, 60°, 70°, 80°, or 90° relative to the top edge. The cross-ribs may be oriented approximately 0° to approximately 30°, approximately 30° to approximately 45°, approximately 45° to approximately 60°, approximately 30° to approximately 60°, approximately 30° to approximately 90°, or approximately 60° to approximately 90° relative to the top edge.

Certain exemplary embodiments may possess a base portion. If present, it may have an average base height of from approximately 5 µm to approximately 200 µm. For example, the average base height may be greater than or equal to approximately 5 µm, 10 µm, 20 µm, 30 µm, 40 µm, 50 µm, 100 µm, or 200 µm. Further, if present it may have an average base width that is from approximately 0.0 µm to approximately 50 µm wider than the tooth width. For example, the average base width may be greater than or equal to approximately 0.0 µm, 5 µm, 10 µm, 20 µm, 30 µm, 40 µm, or 50 µm wider than the tooth width.

Certain exemplary embodiments may possess teeth or toothed ribs. If present, they may have an average tip length of from approximately 50 µm to approximately 1.0 mm. For example, the average tip length may be greater than or equal to approximately 50 µm, 100 µm, 200 µm, 300 µm, 400 µm, 500 µm, 600 µm, 700 µm, 800 µm, 900 µm, or 1.0 mm. Alternatively, they may be no greater than or equal to 1.0 mm, 900 µm, 800 µm, 700 µm, 600 µm, 500 µm, 400 µm, 300 µm, 200 µm, 100 µm, or 50 µm.

At least a portion of the teeth or toothed ribs may have an average tooth base length of from approximately 50 µm to approximately 1.0 mm. For example, the average tooth base length may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm.

At least a portion of the teeth or toothed ribs may have an average height (combined base portion height and teeth height) of from approximately 50 µm to approximately 1.0 mm. For example, the average height may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm.

At least a portion of the teeth or toothed ribs may have an average center-to-center pitch within a column in the machine direction of from approximately 100 µm to approximately 50 mm. For example, the average center-to-center pitch may be greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. Alternatively, they may be no greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. In addition, adjacent columns of teeth or toothed ribs may be identically disposed at the same position in a machine direction or offset. In an offset configuration, adjacent teeth or toothed ribs are disposed at different positions in the machine direction.

At least a portion of the teeth or toothed ribs may have an average height to base width ratio of from approximately 0.1:1.0 to approximately 500:1.0. For example, the average height to base width ratio may be approximately 0.1:1.0, 25:1.0, 50:1.0, 100:1.0, 150:1.0, 200:1.0, 250:1.0, 300:1.0, 350:1, 450:1.0, or 500:1.0. Alternatively, the average height to base width ratio may be no greater than or equal to approximately 500:1.0, 450:1.0, 400:1.0, 350:1.0, 300:1.0, 250:1.0, 200:1.0, 150:1.0, 100:1.0, 50:1.0, 25:1.0, or 0.1:1.0.

At least a portion of the teeth or toothed ribs can have average base width to tip width ratio of from approximately 1,000:1.0 to approximately 0.1:1.0. For example, the average base width to tip width ratio may be approximately 0.1:1.0, 1.0:1.0, 2:1.0, 3:1.0, 4:1.0, 5:1.0, 6:1.0, 7:1.0, 8:1.0, 9:1.0, 10:1.0, 15:1.0, 20:1.0, 25:1.0, 50:1.0, 100:1.0, 150:1.0, 200:1.0, 250:1.0, 300:1.0, 350:1.0, 450:1.0, 500:1.0, 550:1.0, 600:1.0, 650:1.0, 700:1.0, 750:1.0, 800:1.0, 850:1.0, 900:1.0, 950:1.0, or 1,000:1.0. Alternatively, the average base width to tip width ratio may be no greater than approximately 1,000:1.0, 950:1.0, 900:1.0, 850:1.0, 800:1.0, 750:1.0, 700:1.0, 650:1.0, 600:1.0, 550:1.0, 500:1.0, 450:1.0, 400:1.0, 350:1.0, 300:1.0, 250:1.0, 200:1.0, 150:1.0, 100:1.0, 50:1.0, 25:1.0, 20:1.0, 15:1.0, 10:1.0, 9:1.0, 8:1.0, 7:1.0, 6:1.0, 5:1.0, 4:1.0, 3:1.0, 2:1.0, 1.0:1.0, or 0.1:1.0.

It is appreciated that any of the rib patterns described herein may have a spacing between columns to allow for gas to rise during over-charging events. Further, the broken rib pattern may have no spacing in the machine direction between the rows of broken ribs to provide strength if the separator is folded to form an envelope. In addition, the broken rib separators may further be embossed. It is further appreciated that any of the rib patterns or other protrusions may be disposed on any interior surface of the battery case or on any surface on either or both of the positive and negative electrodes. For batteries placed in vehicles, a preferred embodiment may place the separators in an orientation that is generally parallel to the motion of the vehicle so as to take advantage of the starting and stopping motion of that vehicle.

It is believed that the improved separators described herein, such as the broken rib separators described herein, may further help to prevent the formation of sulfation crystals, and may also assist in providing a more uniform thermal distribution and/or thermal mixing and/or thermal or heat dissipation (dissipating heat in a lower amount of time, compared with known separators, such as solid ribbed separators, for flooded lead acid batteries) across the separator. It is also believed that the exemplary broken rib separators described herein may also provide improved or faster or more efficient filling of flooded lead acid batteries, gel batteries, AGM batteries, PSoC batteries, ISS batteries, and/or enhanced flooded batteries.

In various embodiments of the present disclosure, the disclosed separator provides for reduced acid stratification, or even the complete elimination of acid stratification altogether, such that the mixing level or volume uniformity of the acid or electrolyte within the flooded lead acid battery is 1.0 or nearly approaches 1.0. In various embodiments, the separator disclosed herein is also a low electrical resistance (ER) separator. In such embodiments, the separator may contain improvements, such as improved fillers, which increase the porosity, pore size, internal pore surface area, wettability and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. By way of example, the improved separator may be formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that facilitate the flow of electrolyte and ions across the separator. Such also leads to decreased overall electrical resistance as such a separator is used in a flooded battery, such as an enhanced flooded battery.

The low ER microporous separators herein further may comprise a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators. The ultrahigh molecular weight polyethylene in the separator may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator). In certain of these low ER embodiments of the present separator, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher.

In certain selected embodiments, the disclosed separators exhibit decreased electrical resistance, for instance, an electrical resistance no greater than about 200 m$\Omega$·cm$^2$, 180 m$\Omega$·cm$^2$, 160 m$\Omega$·cm$^2$, 140 m$\Omega$·cm$^2$, 120 m$\Omega$·cm$^2$, 100 m$\Omega$·cm$^2$, 80 m$\Omega$·cm$^2$, 60 m$\Omega$·cm$^2$, 50 m$\Omega$·cm$^2$, 40 m$\Omega$·cm$^2$, 30 m$\Omega$·cm$^2$, or 20 m$\Omega$·cm$^2$. In various embodiments, the separators described herein exhibit about a 20% or more reduction in ER compared with a known separator of the same thickness. For example, a known separator may have an ER value of 60 m$\Omega$·cm$^2$; thus, a separator according to the present invention at the same thickness would have an ER value of less than about 48 m$\Omega$·cm$^2$. The separators described herein having low ER may have any or all of the features set forth in U.S. Provisional Patent Application No. 62/319,959, owned by Daramic, LLC and filed Apr. 8, 2016, which provisional application is hereby incorporated by reference in its entirety.

In accordance with at least selected embodiments, the present disclosure is directed to improved lead-acid batteries, such as flooded lead-acid batteries, improved systems that include a lead-acid battery, and/or a battery separator, improved battery separators, improved vehicles including such systems, methods of manufacture or use, or combinations thereof. In accordance with at least certain embodiments, the present disclosure is directed to improved flooded lead-acid batteries, improved battery separators for such batteries, and/or methods of manufacturing, testing, or using such improved flooded lead-acid batteries, or combinations thereof. In addition, disclosed herein is a method, system, battery, and/or battery separator for reducing acid stratification, enhancing battery life and performance in a flooded lead-acid battery.

Exemplary separators as disclosed herein may preferably be characterized by having or by providing improved conductance over time. Conductance may be determined as cold-cranking amps (CCA), measured for instance in a Midtronics tester. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days as measured by a Midtronics CCA tester.

The porous membrane can be provided in various ways with the additive, surfactant, agents, fillers, or additives. For example, the additive or additives may be applied to the porous membrane when it is finished (e.g., after the extraction) and/or added to the mixture used to produce the membrane. According to a preferred embodiment, the additive or a solution of the additive is applied to the surface of the porous membrane. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the microporous membrane.

The application may also take place by dipping the microporous membrane in the additive or a solution of the additive and subsequently optionally removing the solvent, e.g. by drying. In this way the application of the additive can be combined for example with the extraction often applied during separator production.

Another preferred option is to mix the additive or additives into the mixture of thermoplastic polymer and optionally fillers and other additives which is used to produce the porous membrane. The additive-containing homogeneous mixture is then formed into a web-shaped material.

The inventive separator may be a Low ER separator, a Low Water Loss separator, and/or can have at least a portion including protrusions, broken ribs, serrated ribs, discontinuous ribs, and/or the like (rather than solid ribs) to improve the acid mixing or conductance of the separator. Protrusions include features such as short rib segments, nubs, embossments, and the like. The protrusions can be on either face, or both faces of the separator. Typically, the protrusions will at least be on the side facing the positive plate (the positive active material or PAM). The protrusions can be arranged in rows, the protrusions in each row being spaced apart from each other and from the protrusions in adjacent rows. In some instances, the protrusions can be located on the side of the separator facing the positive active material, the side of the separator facing the negative active material (or NAM), or both sides of the separator.

The separators of the present invention can be provided either in sheet form or in the form of a piece separator, a wrap, sleeve, pocket, an envelope, a hybrid envelope, a plate wrap, a plate sliver wrap (for example, a plate sliver wrap under a plate wrap, for example, in a five-point battery system, for example, a system that comprises a positive plate, the fibrous mat described herein used as a sliver wrap, a plate wrap, a boot, and a separator around the plate wrap and/or around an adjacent negative plate), and so forth. In some embodiments, a microporous membrane, which may be covered on at least one side with at least one fibrous layer, is provided as a pocket or envelope. When the fibrous layer is present, it is preferred that the microporous membrane has a larger surface area than the fibrous layers. Thus, when combining the microporous membrane and the fibrous layers, the fibrous layers do not completely cover the microporous layer. It is preferred that at least two opposing edge regions of the membrane layer remain uncovered to provide edges for heat sealing which facilitates the formation of pockets or envelope. The separators can be processed to form hybrid envelopes. The hybrid envelope can be formed by forming one or more slits or openings before, during or after, folding the separator sheet in half and bonding edges of the separator sheet together so as to form an envelope. The sides are bonded together using welds or mechanical seals to form seams that bring one side of the separator sheet into contact with another side of the separator sheet. Welds can be accomplished, for instance, using heat or ultrasonic processes. This process results in an envelope shape having a bottom folded edge and two lateral edges.

Separators disclosed herein in the form of an envelope may be a hybrid envelope and have one or more slits or openings along the folded or sealed creases of the Envelope. The Length of the Openings can be at Least $1/50$, $1/25$, $1/20$, $1/15$, $1/10$, $1/8$, $1/5$, $1/4$, or $1/3$ the length of the entire edge. The length of the openings can be $1/50$ to $1/3$, $1/25$ to $1/3$, $1/20$ to $1/3$, $1/20$ to $1/4$, $1/15$ to $1/4$, $1/15$ to $1/5$, or $1/10$ to $1/5$ the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelop.

Separators as disclosed herein may be characterized by improved conductance over time. Conductance may be determined as cold-cranking amps (CCA), measured for instance in a Midtronics tester. For instance, a lead-acid battery equipped with the inventive separator can exhibit a decrease of less than 10%, less than 9%, less than 8%, less than 7%, less than 6%, less than 5%, less than 4%, less than 3%, less than 2%, less than 1%, or less than 0.5% CCA over a period of 30 days as measured by a Midtronics CCA tester. In contrast, the CCA decrease observed for conventional batteries under similar conditions is often much greater.

The separators provided herein permit the production of batteries with reduced water loss and float currents in batteries compared to batteries made from conventional separators. In some embodiments, water loss can be reduced by more than 10%, 20%, 30%, 40%, 50%, 60%, 70% or 80%. In some embodiments, float current can be reduced by more than 10%, 20%, 30%, 40%, 50%, 60%, 70% or 80%. Batteries prepared using the disclosed separators exhibit reduced internal resistance increase over time, and in some cases exhibit no increased internal resistance.

Besides lowering water loss and leading to extended battery life, possibly preferred separators are also designed to bring other benefits. With regard to assembly, the separators have the negative cross rib design to maximize bending stiffness and ensure highest manufacturing productivity. To prevent shorts during high speed assembly and later in life, the separators have superior puncture and oxidation resistance when compared to standard PE separators.

In accordance with at least selected embodiments, the present disclosure or invention is directed to improved battery separators, Low ER or high conductance separators, improved lead-acid batteries, such as flooded lead-acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

It is believed that the improved separators described herein, such as the broken rib separators described herein, may further help to prevent the formation of sulfation crystals, and may also assist in provided a more uniform thermal distribution and/or thermal mixing and/or thermal or heat dissipation (dissipating heat in a lower amount of time, compared with known separators, such as solid ribbed separators, for flooded lead acid batteries) across the separator. It is also believed that the exemplary broken rib separators described herein may also provide improved or faster or more efficient filling of flooded lead acid batteries, gel batteries, and/or enhanced flooded batteries.

In various embodiments, the separator disclosed herein is also a low electrical resistance ("ER") separator. In such embodiments, the separator may contain improvements, such as improved fillers, which increase the porosity, pore size, internal pore surface area, wettability and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. By way of example, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.

The separator contains one or more performance enhancing additives. The performance enhancing additive can be a surfactant. Certain suitable surfactants are non-ionic while other suitable surfactants are anionic. The additive can be a single surfactant or a mixture of two or more surfactants, for instance two or more anionic surfactants, two or more non-ionic surfactants, or at least one ionic surfactant and at least one non-ionic surfactant. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like for that lead acid battery. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary or tertiary amines; quaternary amines; block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

The battery separators can be combined in various ways with the additive(s), agent(s), and/or filler(s). The additive or additives can for example be applied to the separator when it is finished (e.g., after the extraction and/or rubber introduction) and/or added to the mixture used to extrude and ultimately produce the separator. According to certain preferred embodiments, the additive or a solution (such as an aqueous solution) of the additive is applied to one or more surfaces of the separator. This variant is suitable in particular for the application of non-thermostable additives and additives which are soluble in the solvent used for the extraction of processing oil. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator. Application can also take place during the extraction of the pore forming agent while in a solvent bath. In some embodiments, the additive can be combined with the microporous membrane using any of the aforementioned methods, prior to or after introduction of the rubber component. In certain select embodiments, some portion of a performance enhancing additive, such as a surfactant coating or a performance enhancing additive added to the extruder before the separator is made (or both) may combine with the antimony in the battery system and may inactivate it and/or form a compound with it and/or cause it to drop down into the mud space of the battery and/or prevent it from depositing onto the negative electrode.

In certain embodiments, the additive (such as a non-ionic surfactant, an anionic surfactant, or mixtures thereof) can be present at a density or add-on level of at least 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m² or 10.0 g/m² or even up to about 20.0 g/m². The additive can be present on the separator at a density or add-on level between 0.5-15 g/m², 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 4.5-7.5 g/m², 5.0-10.5 g/m², 5.0-11.0 g/m², 5.0-12.0 g/m², or 5.0-15.0 g/m².

The application may also take place by dipping the battery separator in the additive or a solution of the additive (solvent bath addition) and removing the solvent if necessary, e.g., by drying. In this way the application of the additive can be combined for example with the extraction often applied during membrane production. Other preferred methods are to spray the surface with additive, dip coat, roller coat, or curtain coat the one or more additives on the surface of separator.

Another preferred option is to mix the additive or additives into the mixture of thermoplastic polymer and optionally fillers and other agents or additives which is used to produce the membrane. The additive-containing mixture is then formed into a web-shaped material.

In certain embodiments described herein, a reduced amount of anionic or non-ionic surfactant is added to the inventive separator. In such instances, a desirable feature may include lowered total organic carbons (TOCs) and/or lowered volatile organic compounds (VOCs) (because of the lower amount of surfactant) may produce a desirable separator according to such embodiment.

In certain embodiments, the additive can be represented by a compound of Formula (I)

$$R(OR^1)_n(COOM_{1/x}{}^{x+})_m \qquad (I)$$

in which:

R is a non-aromatic hydrocarbon radical with 10 to 4200 carbon atoms, preferably 13 to 4200, which can be interrupted by oxygen atoms;

$R^1$=H; $R^1$=—$(CH_2)_k COOM_{1/x}{}^{x+}$; or $R^1$= —$(CH_2)_k SO_3 M_{1/x}{}^{x+}$, preferably H, where k=1 or 2;

M is an alkali metal or alkaline-earth metal ion, $H^+$ or $NH_4{}^+$, where not all the variables M simultaneously have the meaning $H^+$;

n=0 or 1;

m=0 or an integer from 10 to 1400; and x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, (e.g., contain one or more ether groups).

R is preferably a straight-chain or branched aliphatic hydrocarbon radical which can be interrupted by oxygen atoms. Saturated, uncross-linked hydrocarbon radicals are quite particularly preferred.

Through the use of the compounds of Formula (I) for the production of battery separators, they can be effectively protected against oxidative destruction.

Battery separators are preferred which contain a compound according to Formula (I) in which:

R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—$[(OC_2H_4)p(OC_3H_6)_q]$—, in which:

$R^2$ is an alkyl radical with 10 to 30 carbon atoms, preferably 12 to 25, particularly preferably 14 to 20 carbon atoms;

p is an integer from 0 to 30, preferably 0 to 10, particularly preferably 0 to 4; and q is an integer from 0 to 30, preferably 0 to 10, particularly preferably 0 to 4;

compounds being particularly preferred in which the sum of p and q is 0 to 10, in particular 0 to 4;

n=1; and m=0.

Formula $R2$-$[(OC_2H_4)p(OC_3H_6)_q]$— is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which R2 is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$, n=0;

m is an integer from 10 to 1400; and x=1 or 2.

As suitable additives there may be mentioned here in particular polyacrylic acids, polymethacrylic acids and acrylic acid-methacrylic acid copolymers, whose acid groups are at least partly (e.g., preferably 40%, particularly preferably 80%) neutralized. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium (NR4, wherein R is either hydrogen or a carbon functional group). By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some embodiments, the microporous polyolefin separator layer may include a coating on one or both sides of such layer. Such a coating may include a surfactant or other material. In certain embodiments, the coating is combined with the membrane prior to rubber addition, the coating is combined after rubber addition, or the coating is combined both before and after rubber addition. In some embodiments, the coating may include one or more materials described, for example, in U.S. Pat. No. 9,876,209B2, which is incorporated by reference herein. Such a coating may, for example, reduce the overcharge voltage of the battery system, thereby extending battery life with less grid corrosion and preventing dry out and/or water loss.

The improved separators are useful in a variety of battery, particularly lead acid battery, applications. The battery can be a flooded battery, which may be a tubular or flat plate battery. The batteries can be used in motive applications such as golf cart (sometimes referred to as golf car) batteries, or other deep-cycling applications such as solar or wind power battery.

Batteries, in particular, flooded lead acid batteries, in particular, deep cycle batteries, having the improved separators disclosed herein can be characterized by lower float current (in Amps) after charging a 12 Volt battery at a float voltage of 14.4 volts (or 2.4 volts per cell, where the 12 Volt battery has six cells) for a given time, such as 21 days, and testing may extend out to 84 days, measuring at 21-day intervals.

In addition, the inventive battery separators disclosed and described herein provide the improved deep cycle batteries in which they are used with a more consistent, and lower, end of charge (EOC) current. Maintaining lower EOC current reveals that the improved batteries described herein are exhibiting Sb poisoning suppression. By way of example, as a new deep cycle lead acid battery ages, more Sb is in the battery, meaning that the EOC current may increase over the life of the battery, thereby increasing the water consumption of the battery and thereby reducing the overall life cycle performance of the battery. The inventive separators described herein mean that the EOC current is maintained more consistently throughout the cycle life of the battery, thereby showing reduction in Sb poisoning.

End of charge current may sometimes be referred to as the float current necessary to maintain fixed voltage for a lead acid battery during idle periods. In a lead acid battery with antimony, typical behavior is illustrated with conventional lead acid battery separators; antimony poisoning occurs and is observed by measuring an increase in end of charge current over life cycle. And the antimony suppressing battery separators that are currently on the market, or the current best available technology, reduces antimony poisoning to some extent. However, the separators discovered in accordance with this invention can meet or even surpass the current best available technology. The separators herein disclosed provide at a minimum a level of antimony suppression that is equivalent to, but often better than, the known best available technology while also further reducing end of charge current below today's best available technology.

In short, the improved, flexible battery separators described and claimed herein, which include at least one performance enhancing additive and/or coating, when used in a flooded lead acid battery, such as a deep cycle flooded lead acid battery, result in an improved and even significantly improved deep cycle flooded lead acid battery in terms of: enhanced antimony suppression relative to a battery made using a separator made completely of rubber and relative to a battery made using a separator that does not include a rubber and/or latex component (measured via end of charge (EOC) voltage and shown by improved EOC voltage suppression). Regarding antimony suppression, antimony poisoning can occur from the outset of operation of a lead acid battery, such as a flooded lead acid battery, such as a deep cycling flooded lead acid battery. However, over the life of the battery, more antimony is released from repeated operation of the battery, meaning that the antimony suppression becomes even more critical later in the life of the battery. The improved separators described herein address the same in that they work to suppress antimony, even toward the end of the life of the battery, for example, past 50% of the built-in or intended life of the battery.

In addition, the improved, flexible battery separators described herein also provide a deep cycle flooded lead acid battery that exhibits a decreased float charge current at a steady state potential relative to batteries made using previously known separators; a reduction in the voltage and/or energy required to return the deep cycle operated battery to full charge, relative to a deep cycle battery made using a previously known separator; overall improved voltage control relative to a battery made using a previously known separator; and/or reduced grid corrosion relative to a battery made using a previously known separator.

In addition, it has been found in experiments using separators of the present invention, that Sb poisoning is reduced for batteries using the same. Sb poisoning manifests itself as a reduction of the hydrogen evolution overpotential, or an increase in the rate of hydrogen evolution by electrochemically reducing water. One can measure this overpotential by measuring the hydrogen evolution current at a fixed potential, and such experiments showed that separators according to the present invention performed better than known separators. In similar experimentation, it was also determined that a difference can be seen for the large anodic (positive current) peak associated with CV curves for batteries containing separators according to the present invention. Such a peak is attributed to the oxidation of Pb to $PbSO_4$ on the surface of the lead working electrode. And for conventional, comparative separators, the peak position was shown to shift positively, by 40-60 mV, which can be attributed to the presence of Sb on the surface changing the chemistry of the Pb to $PbSO_4$. For batteries containing a separator according to the present invention, a smaller shift in peak position is observed, which is indicative of the suppression of Sb on the lead surface. This observation, taken with the clear reduction in the rate of hydrogen evolution indicates that the separators according to the present invention is mitigating the deposition of Sb on the negative (lead) electrode.

Disclosed herein are improved separators for lead acid batteries. The separators may include a porous membrane, rubber and/or latex, and at least one performance enhancing additive or surfactant.

In accordance with at least selected embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for enhanced flooded batteries. In addition, disclosed herein are methods, systems and battery separators for enhancing battery life, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries wherein the separator has performance enhancing additives or coatings, improved fillers, decreased tortuosity, increased wettability, reduced oil content, reduced thickness, decreased electrical resistance, and/or increased porosity, and where the use of such a separator in a battery reduces the water loss of the battery, lowers acid stratification of the battery, lowers the voltage drop of the battery, and/or increases the CCA of the battery. In accordance with at least certain embodiments, separators are provided that include or exhibit performance enhancing additives or coatings, increased porosity, increased void volume, amorphous silica, higher oil absorption silica, higher silanol group silica, resistance to antimony poisoning, electrolyte mixing, retention of active material on electrodes, and any combination thereof.

In accordance with at least certain embodiments, the present disclosure or invention is directed to improved flooded lead acid batteries, improved battery separators, mats, composite separators, laminated separators, positive envelopes, negative envelopes, and/or the like for such batteries, and/or methods of manufacturing, testing, or using such improved flooded lead acid batteries, or combinations thereof.

In accordance with at least certain embodiments, aspects and/or objects, the present invention, application, or disclosure may provide solutions, new products, improved products, new methods, and/or improved methods, and/or may address issues, needs, and/or problems of PAM shedding, NAM shedding, electrode distortion, active material shedding, active material loss, and/or physical separation, electrode effectiveness, battery performance, battery life, and/or cycle life, and/or may provide new battery separators, new battery technology, and/or new battery methods and/or systems that address the challenges arising from current lead acid batteries or battery systems, especially new battery separators, new battery technology, and/or new battery methods and/or systems adapted to prevent or impede the shedding of active material from the electrodes in enhanced flooded lead acid batteries, or in other batteries such as other flooded batteries, AGM batteries, PSoC batteries, ISS batteries, ESS batteries, and/or the like.

In at least one possibly preferred embodiment, a separator is provided with a fibrous mat for retaining the active material on an electrode of a lead-acid battery. In at least one possibly particularly preferred embodiment, a PE membrane separator is provided with at least one fibrous mat for retaining the active material on an electrode of a lead-acid battery. New or improved mats, separators, batteries, methods, and/or systems are also disclosed, shown, claimed, and/or provided. For example, in accordance with at least certain embodiments, aspects and/or objects, the present invention, application, or disclosure may provide solutions, new products, improved products, new methods, and/or improved methods, and/or may address issues, needs, and/or problems of PAM shedding, NAM shedding, electrode distortion, active material shedding, active material loss, and/or physical separation, electrode effectiveness, battery performance, battery life, and/or cycle life, and/or may provide new battery separators, new battery technology, and/or new battery methods and/or systems that address the challenges arising from current lead acid batteries or battery systems, especially new battery separators, new battery technology, and/or new battery methods and/or systems adapted to prevent or impede the shedding of active material from the electrodes, preferably or particularly in enhanced flooded lead acid batteries, PSoC batteries, ISS batteries, ESS batteries, or the like.

In at least one embodiment, a separator is provided with a fibrous mat for retaining the active material on an electrode of a lead-acid battery. New or improved mats, separators, batteries, methods, and/or systems are also disclosed, shown, claimed, and/or provided. For example, in at least one possibly preferred embodiment, a composite separator is provided with a fibrous mat for retaining the active material on an electrode of a lead-acid battery. In at least one possibly particularly preferred embodiment, a PE membrane separator is provided with at least one fibrous mat for retaining the active material on an electrode of a lead-acid battery. In accordance with at least certain embodiments, aspects and/or objects, the present invention, application, or disclosure may provide solutions, new products, improved products, new methods, and/or improved methods, and/or may address issues, needs, and/or problems of PAM shedding, NAM shedding, electrode distortion, active material shedding, active material loss, and/or physical separation, electrode effectiveness, battery performance, battery life, and/or cycle life, and/or may provide new battery separators, new battery technology, and/or new battery methods and/or systems that address the challenges arising from current lead acid batteries or battery systems, especially new battery separators, new battery technology, and/or new battery methods and/or systems adapted to prevent or impede the shedding of active material from the electrodes, preferably or particularly in flooded lead acid batteries, enhanced flooded lead acid batteries, PSoC batteries, ISS batteries, ESS batteries, or the like.

In accordance with at least selected embodiments, aspects or objects, the present disclosure or invention is directed to or may provide novel or improved separators, battery separators, enhanced flooded battery separators, fibrous mats, batteries, cells, and/or methods of manufacture and/or use of such separators, battery separators, fibrous mats, enhanced flooded battery separators, cells, and/or batteries. In accordance with at least certain embodiments, the present disclosure or invention is directed to novel or improved enhanced flooded lead acid battery separators for starting lighting ignition ("SLI") batteries, fibrous mats, flooded batteries for deep cycle applications, and/or enhanced flooded batteries, and/or systems, vehicles, and/or the like including such separators, mats or batteries, and/or improved methods of making and/or using such improved separators, mats, cells, batteries, systems, vehicles, and/or the like. In accordance with at least certain embodiments, the present disclosure or invention is directed to an improved separator for enhanced flooded batteries and/or improved methods of making and/or using such batteries having such improved separators. In accordance with at least selected embodiments, the present disclosure or invention is directed to separators, particularly separators for enhanced flooded batteries having reduced electrical resistance and/or increased cold cranking amps. In addition, disclosed herein are methods, systems and battery separators for enhancing battery life, reducing water loss, reducing internal resistance, increasing wettability, reducing acid stratification, improving acid diffusion, improving cold cranking amps and/or improving uniformity in at least enhanced flooded batteries. In accordance with at least particular embodiments, the present disclosure or invention is directed to an improved separator for enhanced flooded batteries wherein the separator includes one or more performance enhancing additives or coatings, increased porosity, increased void volume, amorphous silica, higher oil absorption silica, higher silanol group silica, retention and/or improved retention of active material on electrodes, and/or any combination thereof.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

What is claimed is:

1. A flooded lead-acid battery separator assembly comprising:
   a microporous membrane which comprises a thermoplastic polymer and a mixing profile;
   a nonwoven fibrous mat;
   said fibrous mat being disposed adjacent to said microporous membrane, wherein said fibrous mat comprises fibers selected from the group consisting of: glass fibers, synthetic fibers, and combinations thereof;
   wherein said fibrous mat may be a single layer, double layer, or other multi-layer mat; and
   wherein said fibrous mat may include an additive impregnated into or coated on one or more surfaces of said fibrous mat; and
   wherein an average diameter of the fibers included in the fibrous mat is 7.2 μm (±0.5 μm);
   wherein said fibrous mat has: an average pore size of less than about 5 μm, and an air permeability in the range of approximately 1500 l/m$^2$·s to approximately 2500 l/m$^2$·s; and
   wherein said microporous membrane and fibrous mat are laminated together.

2. The flooded lead-acid battery separator assembly of claim 1, wherein said fibrous mat has a thickness, in the range of 100 μm to 900 μm, and preferably in the range of 200 μm to 450 μm.

3. The flooded lead-acid battery separator assembly of claim 1, wherein said fibrous mat has an electrical resistance less than an electrical resistance in the range of approximately 6 mΩ·cm$^2$ to approximately 14 mΩ·cm$^2$.

4. The flooded lead-acid battery separator assembly of claim 1, wherein said fibrous mat has an area weight in the range of approximately 50 g/m$^2$ to approximately 65 g/m$^2$.

5. The flooded lead-acid battery separator assembly of claim 1, wherein said fibrous mat has a preferred binder content in the range of approximately 15% by weight to approximately 21% by weight.

6. The flooded lead-acid battery separator assembly of claim 1, wherein said fibrous mat has a tensile strength in a machine direction of approximately 200 N/50 mm.

7. The flooded lead-acid battery separator assembly of claim 1, wherein said fibrous mat has a tensile strength in a cross-machine direction of approximately 150 N/50 mm.

8. The flooded lead-acid battery separator assembly of claim 1, wherein said fibrous mat comprises a synthetic fibers.

9. The flooded lead-acid battery separator assembly of claim 1, wherein said synthetic fibers are selected from the group consisting of: polypropylene, polyethylene terephthalate, acrylic, other plastics, polymer, homopolymer, copolymer, and any combination thereof.

10. The flooded lead-acid battery separator assembly of claim 1, wherein said fibrous mat comprises an additive selected from the group consisting of: rubber, silica, soluble fibers, a gelling agent, a surfactant, and combinations thereof.

11. The flooded lead-acid battery separator assembly of claim 1, wherein said microporous membrane comprises said mixing profile comprising one from the group consisting of: broken ribs, angled serrated ribs, serrated ribs, embossed ribs, negative cross ribs, and any combination thereof.

12. The flooded lead-acid battery separator assembly of claim 1, wherein said microporous membrane comprises a plurality of broken ribs, wherein said plurality of broken ribs are defined by an angular orientation.

13. The flooded lead-acid battery separator assembly of claim 12, wherein said angular orientation is relative to a machine direction of said microporous membrane, and said angular orientation is an angle chosen from the group consisting of: between greater than zero degrees (0°) and less than 180 degrees) (180°, and between greater than 180 degrees (180°) and less than 360 degrees (360°).

14. The flooded lead-acid battery separator assembly of claim 1, wherein said microporous membrane comprises a rubber.

15. The flooded lead-acid battery separator assembly of claim 14, wherein said rubber is selected from the group consisting of: latex, methyl rubber, polybutadiene, chloroprene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber, silicone rubber, copolymer rubbers, and combinations thereof.

16. The flooded lead-acid battery separator assembly of claim 15 wherein said copolymer rubbers is selected from the group consisting of: styrene/butadiene rubbers, acrylonitrile/butadiene rubbers, ethylene/polypropylene rubbers (EPM and EPDM), ethylene/vinyl acetate rubbers, and combinations thereof.

17. The flooded lead-acid battery separator assembly of claim 14, wherein said rubber is cross-linked or uncross-linked.

18. A flooded lead-acid battery comprising the separator assembly of claim 12.

19. A flooded lead-acid battery comprising the separator assembly of claim 14.

* * * * *